M. M. GOLDBERG.
REGISTERING AND RECORDING MECHANISM.
APPLICATION FILED JULY 6, 1915.
1,327,153.
Patented Jan. 6, 1920.
17 SHEETS—SHEET 3.
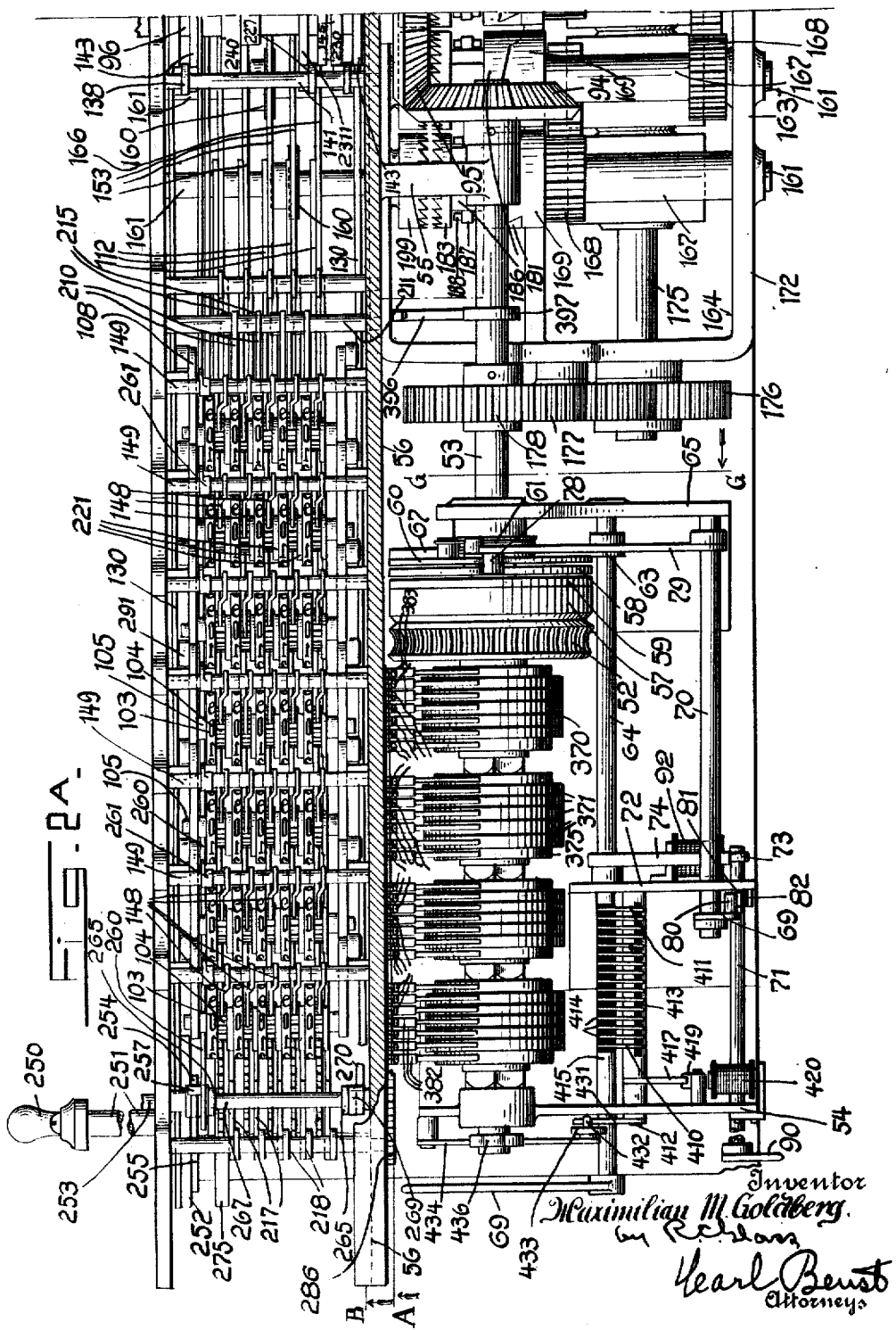
Inventor
Maximilian M. Goldberg.

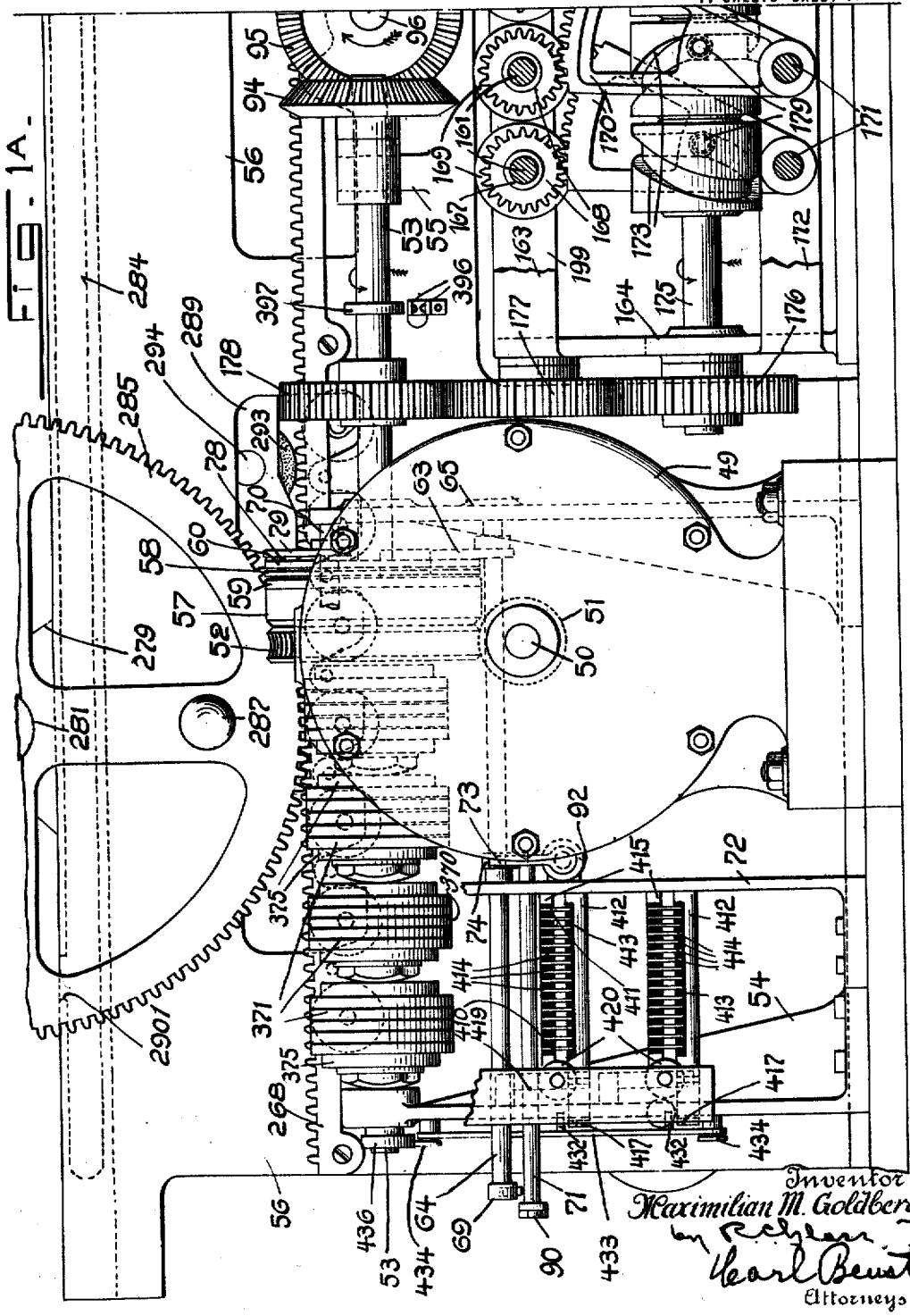

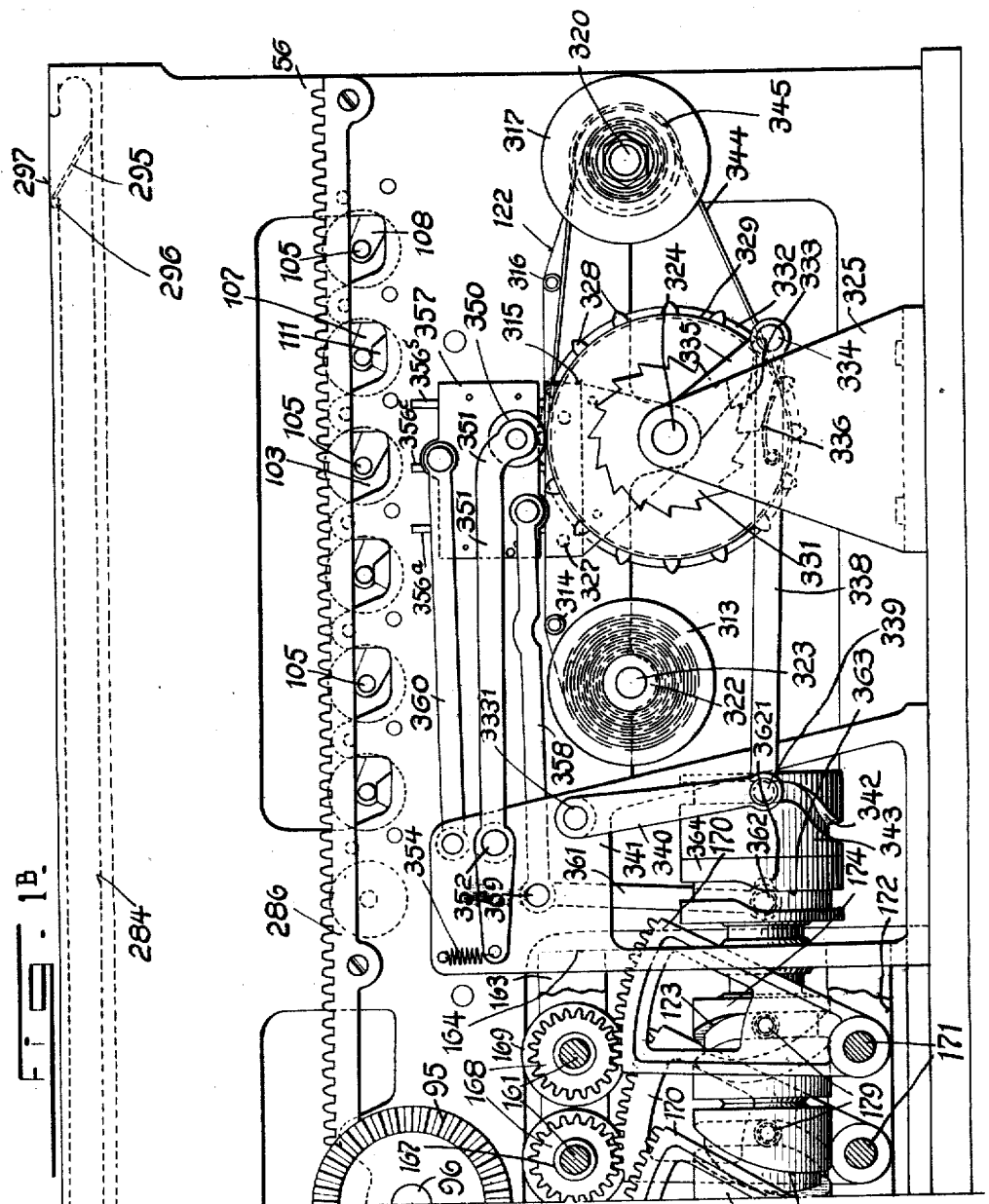

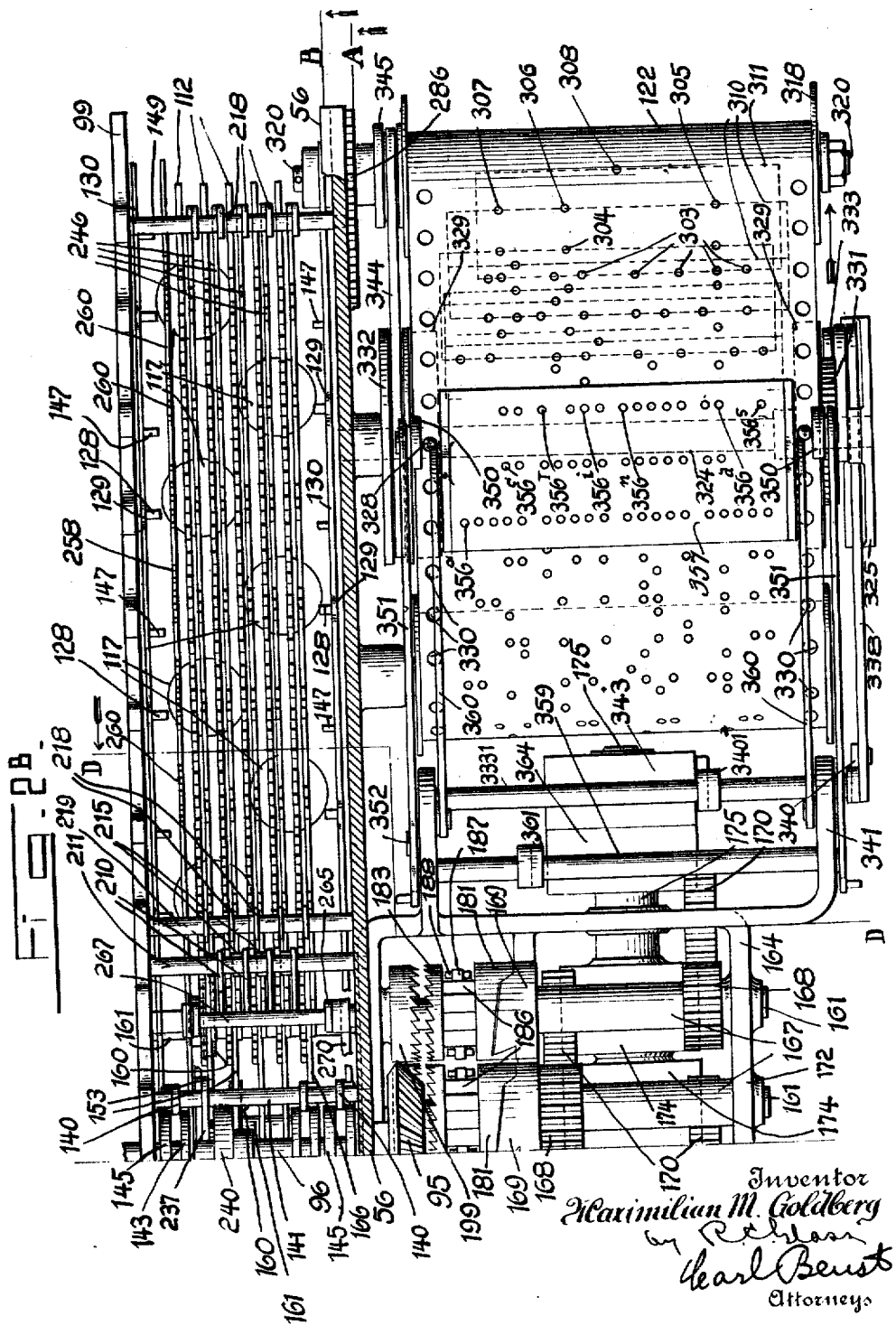

M. M. GOLDBERG.
REGISTERING AND RECORDING MECHANISM.
APPLICATION FILED JULY 6, 1915.
1,327,153. Patented Jan. 6, 1920.
17 SHEETS—SHEET 5.
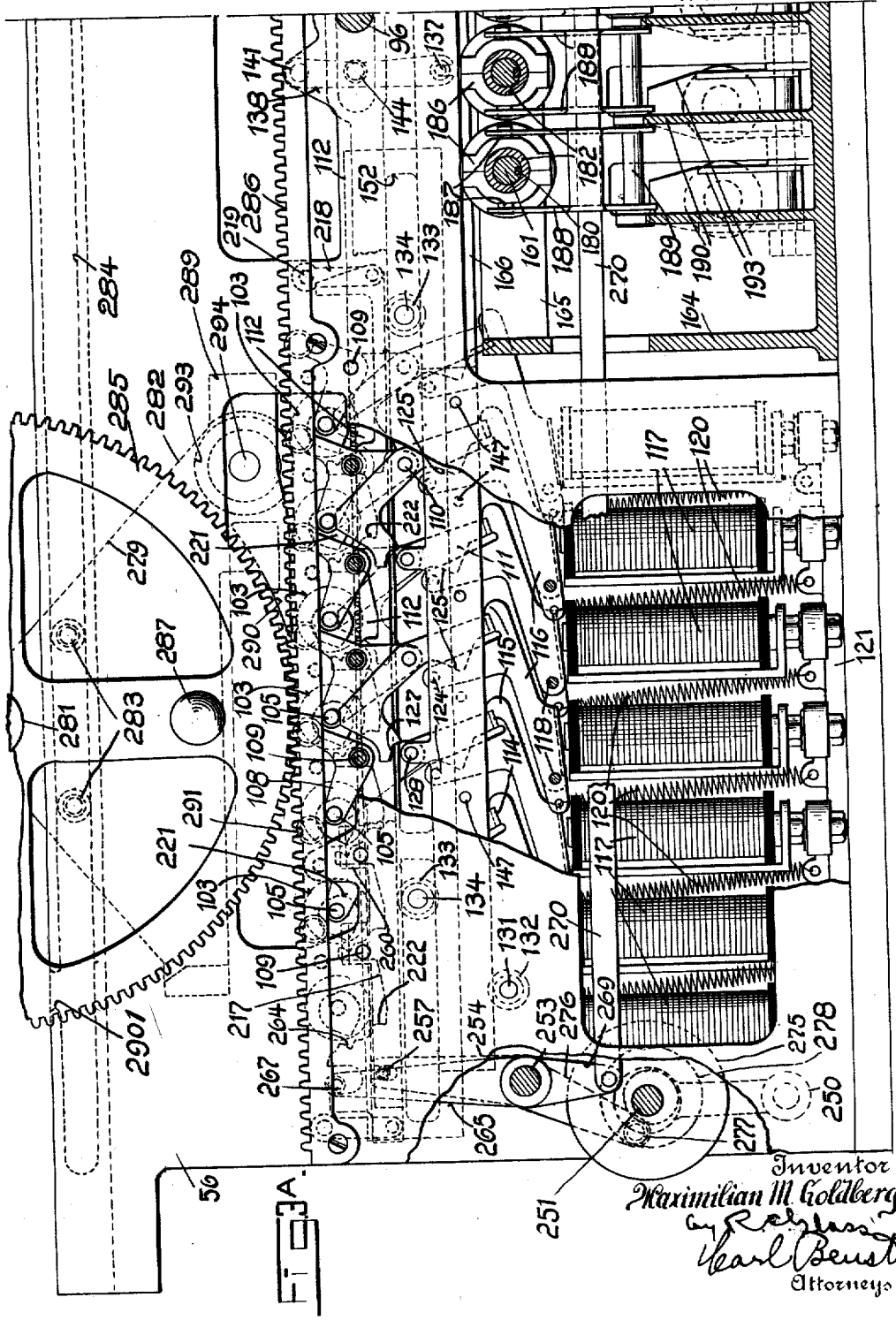
Inventor
Maximilian M. Goldberg
Attorneys

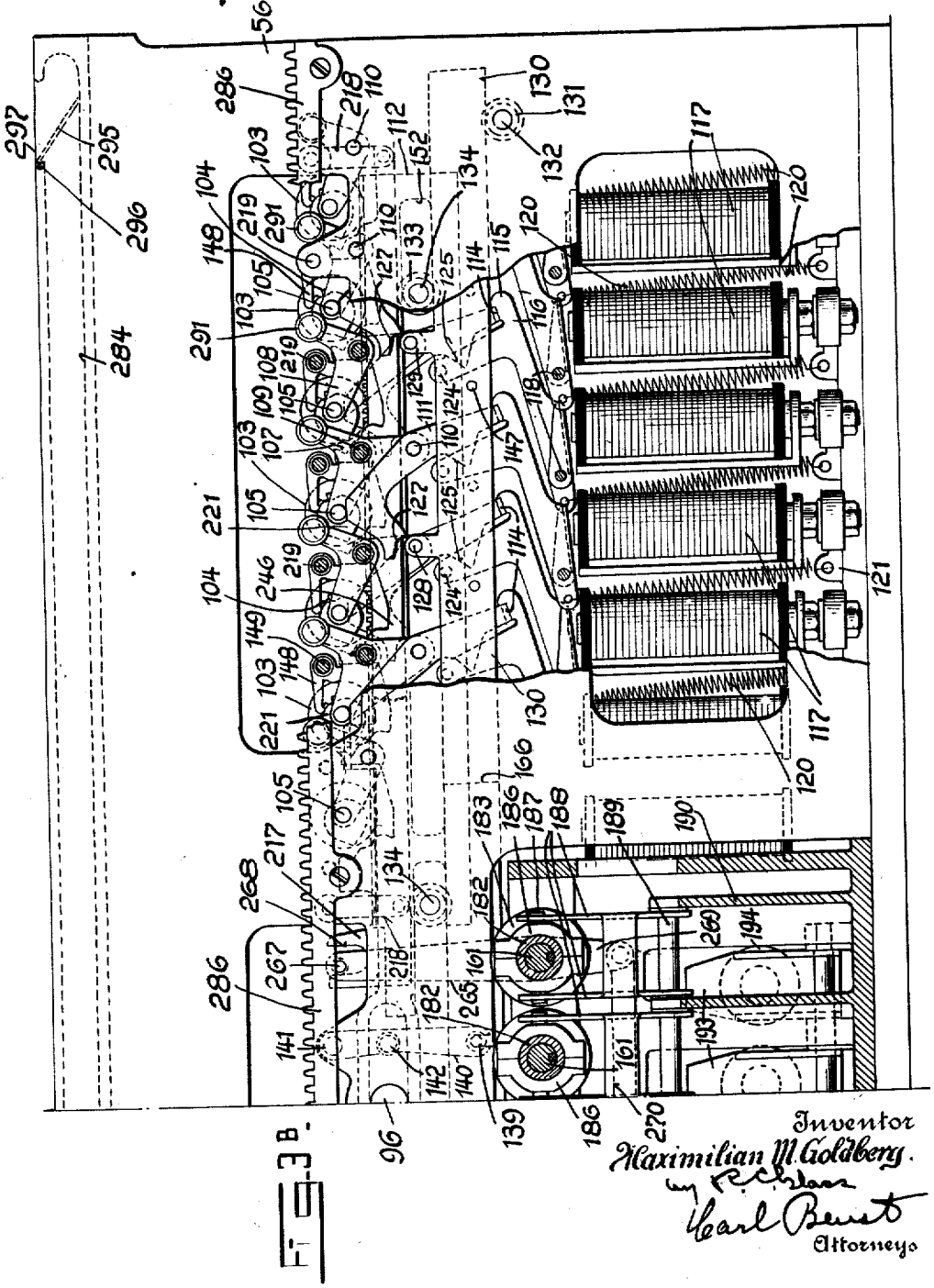

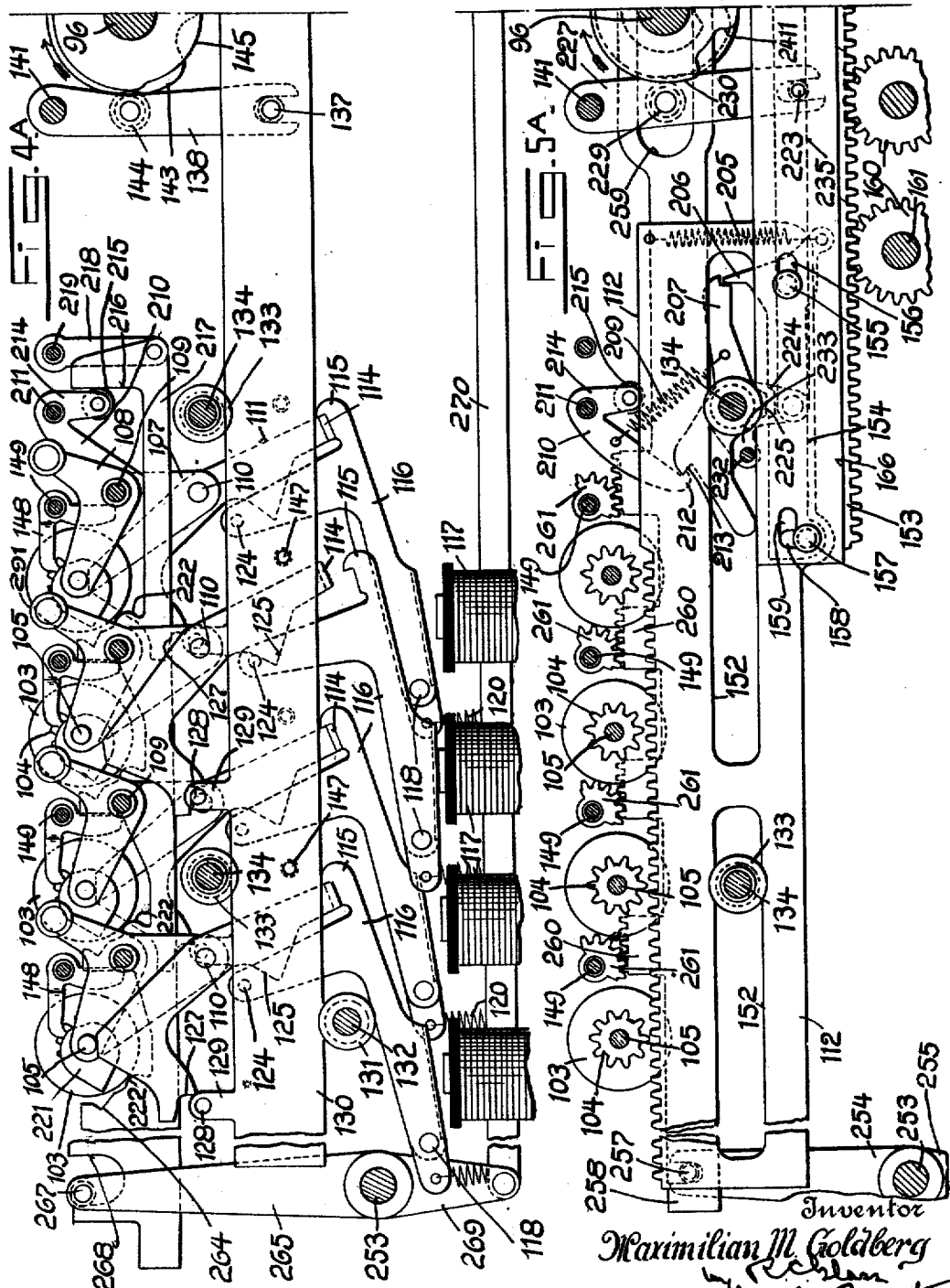

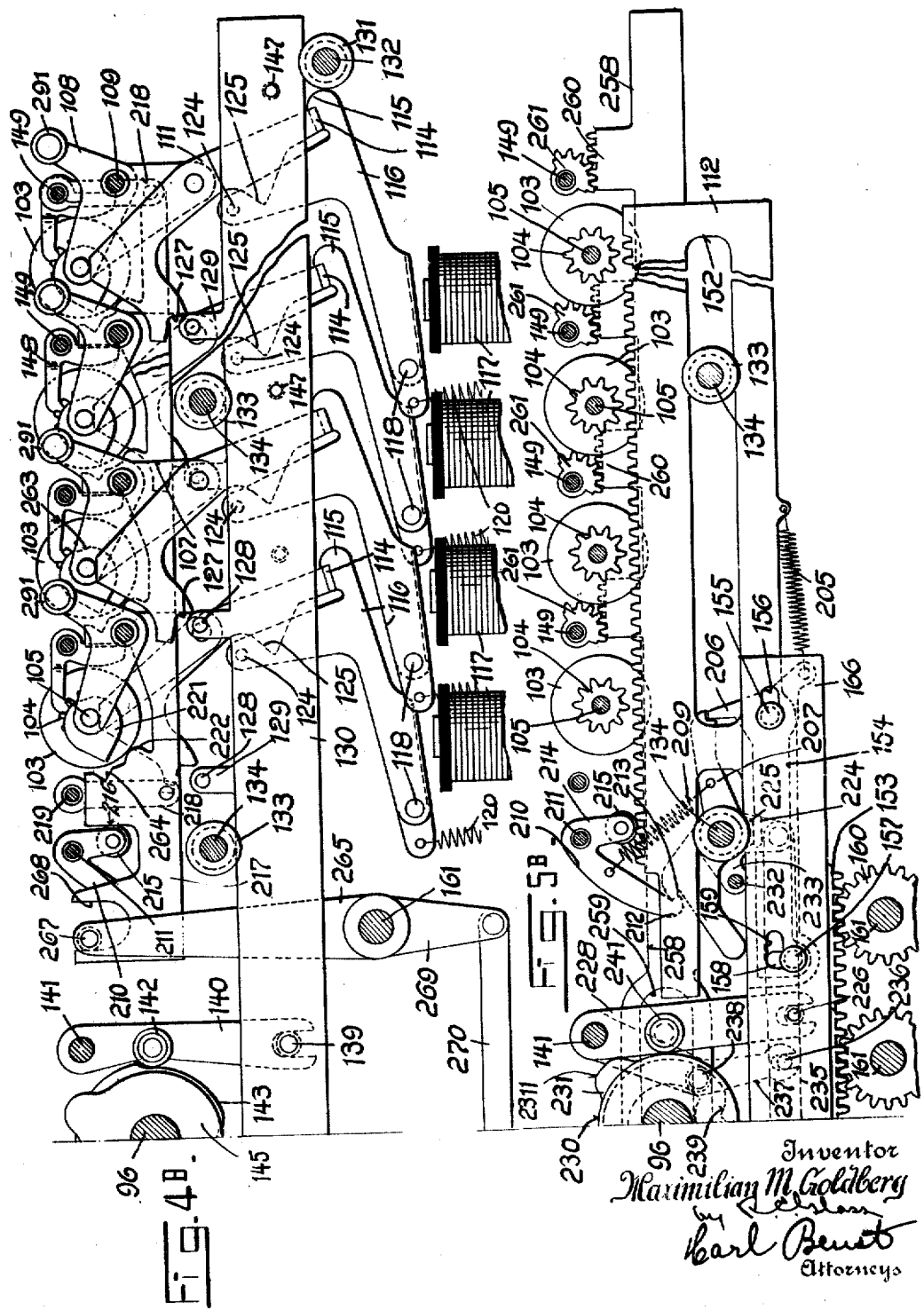

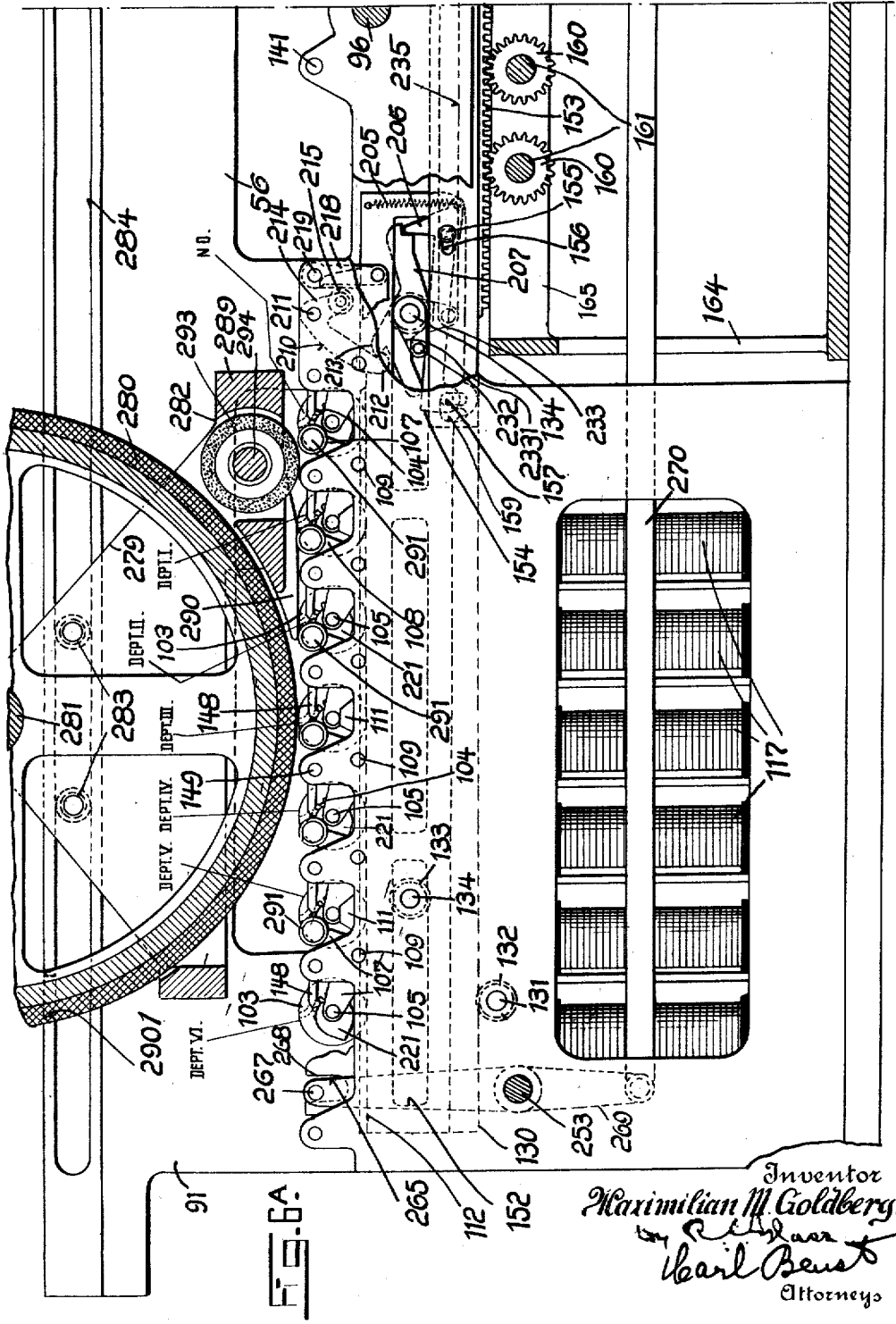

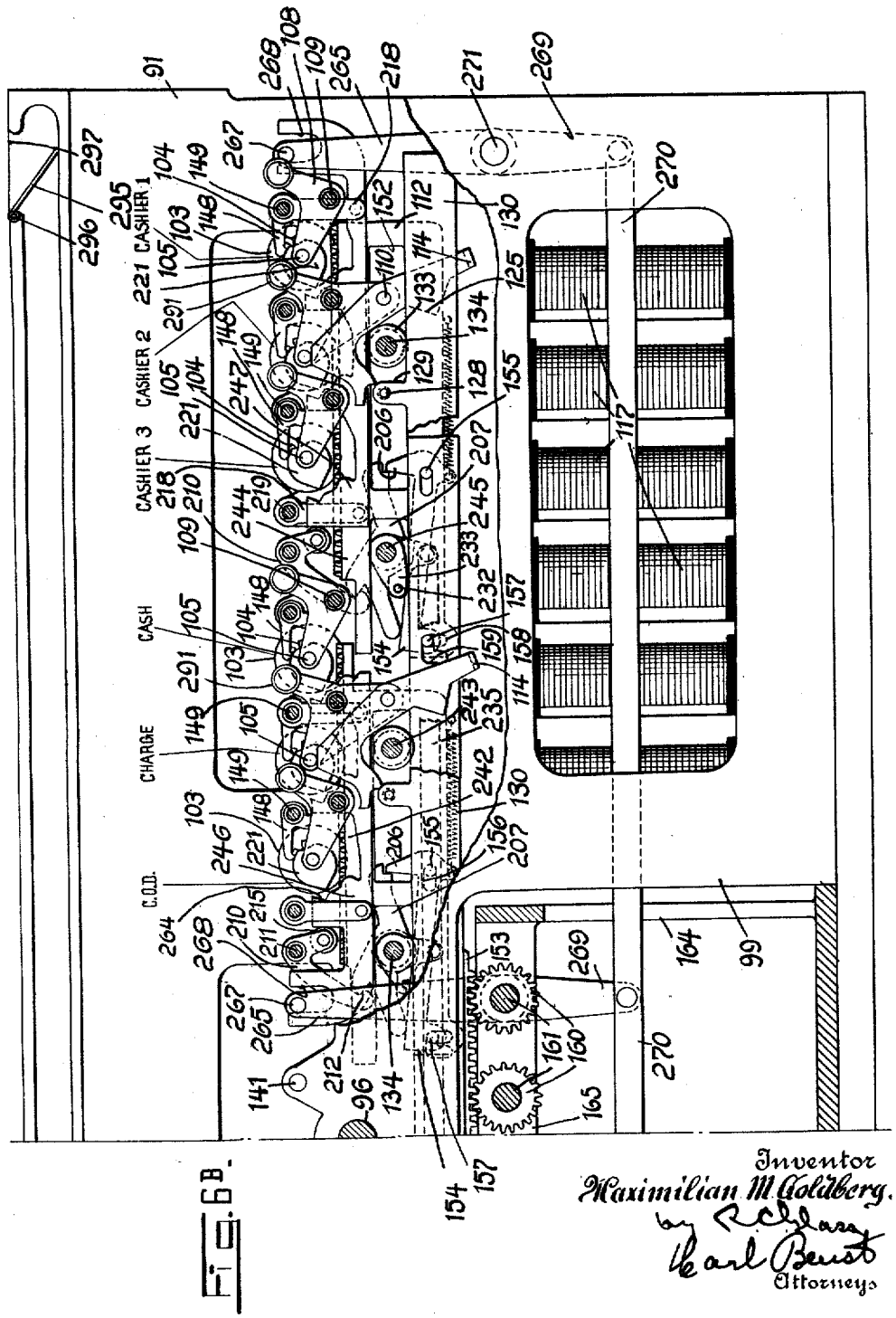

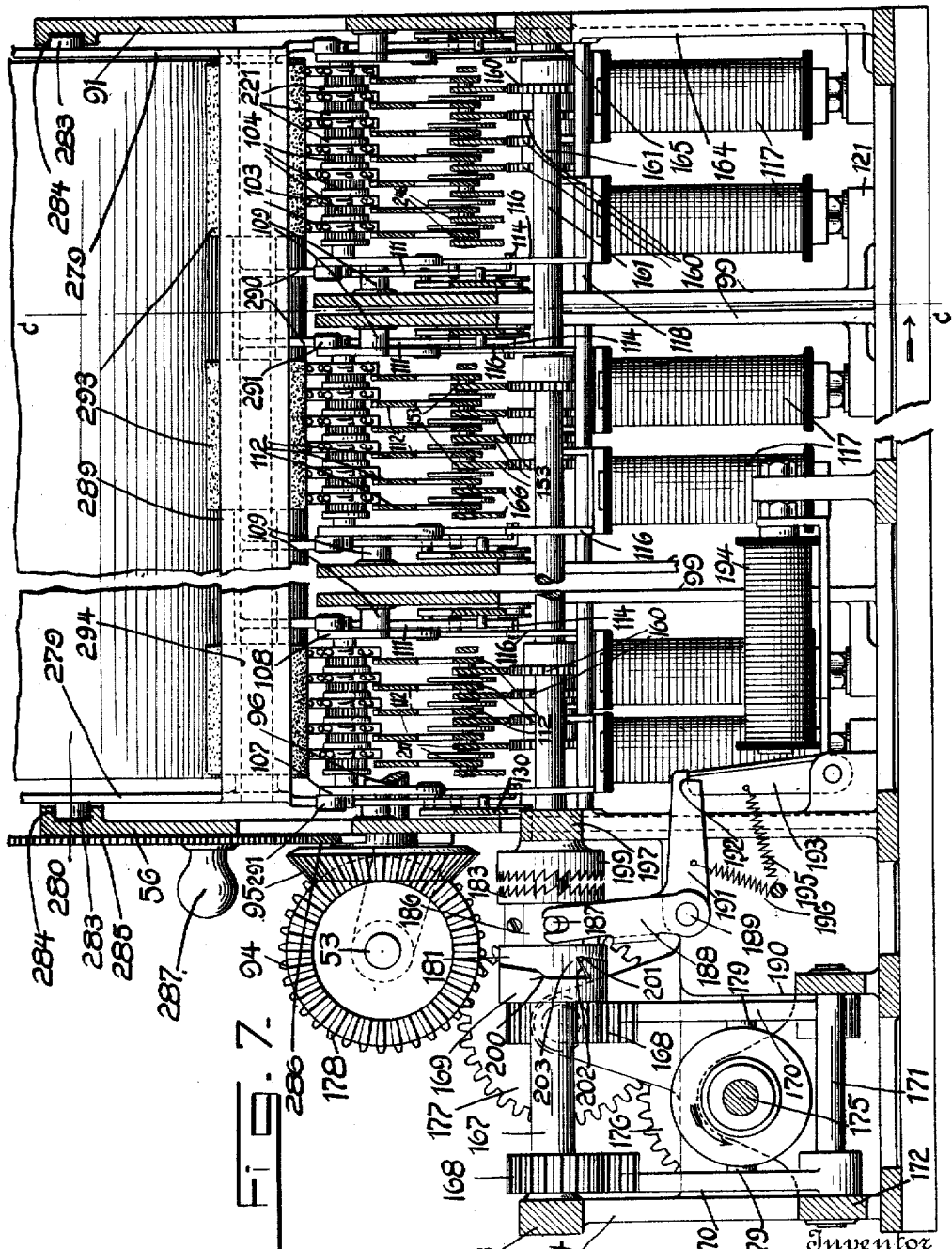

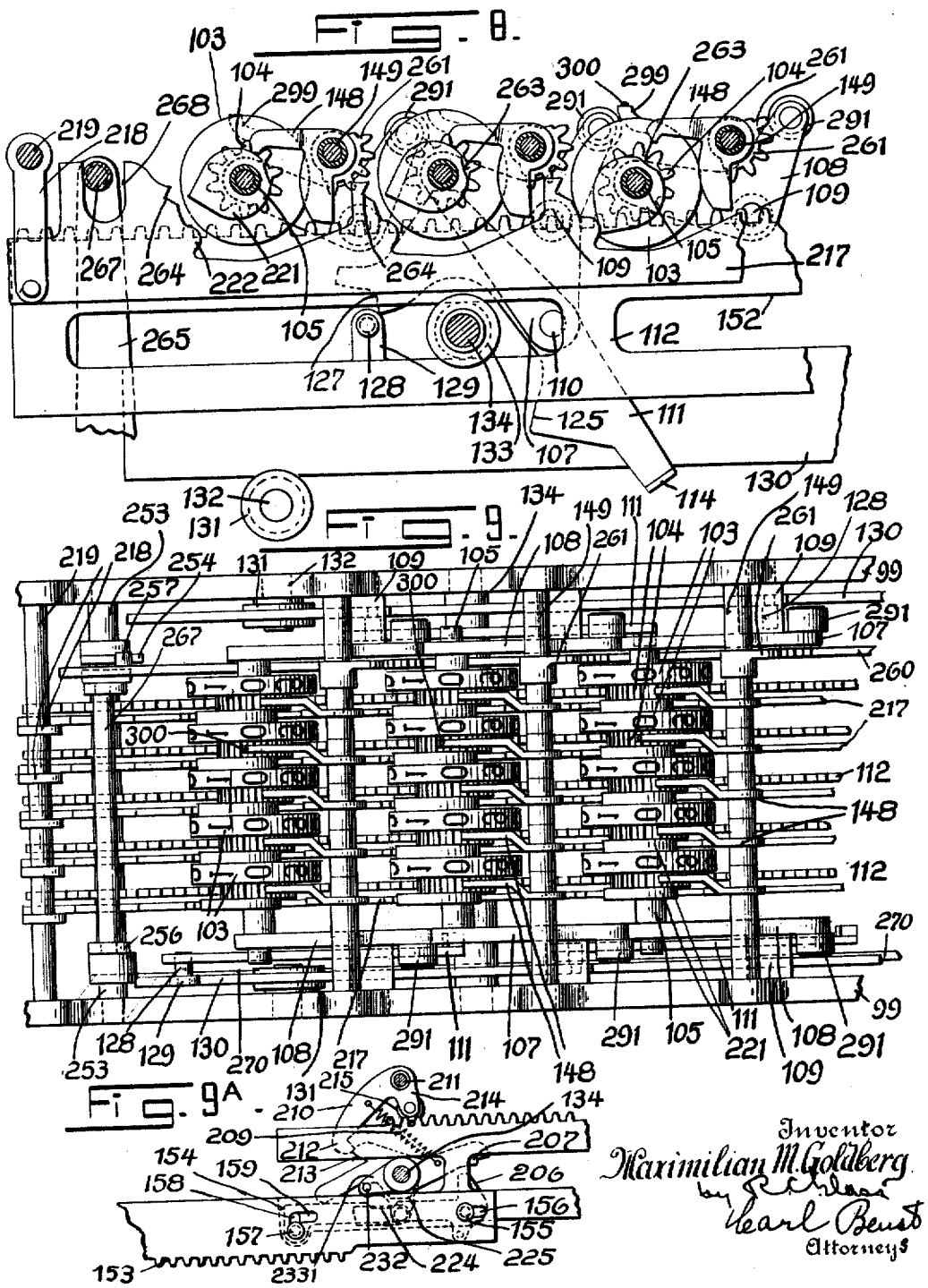

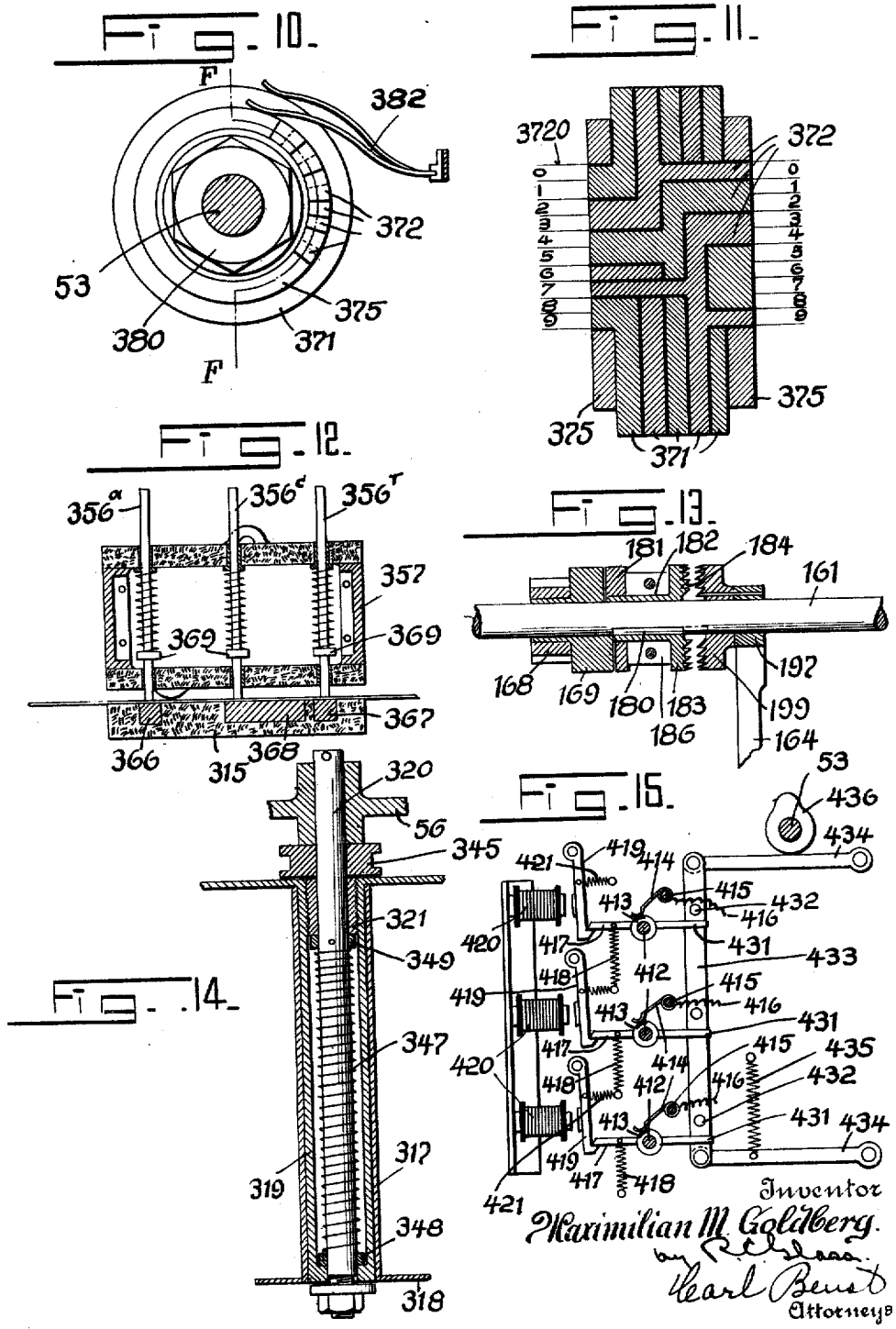

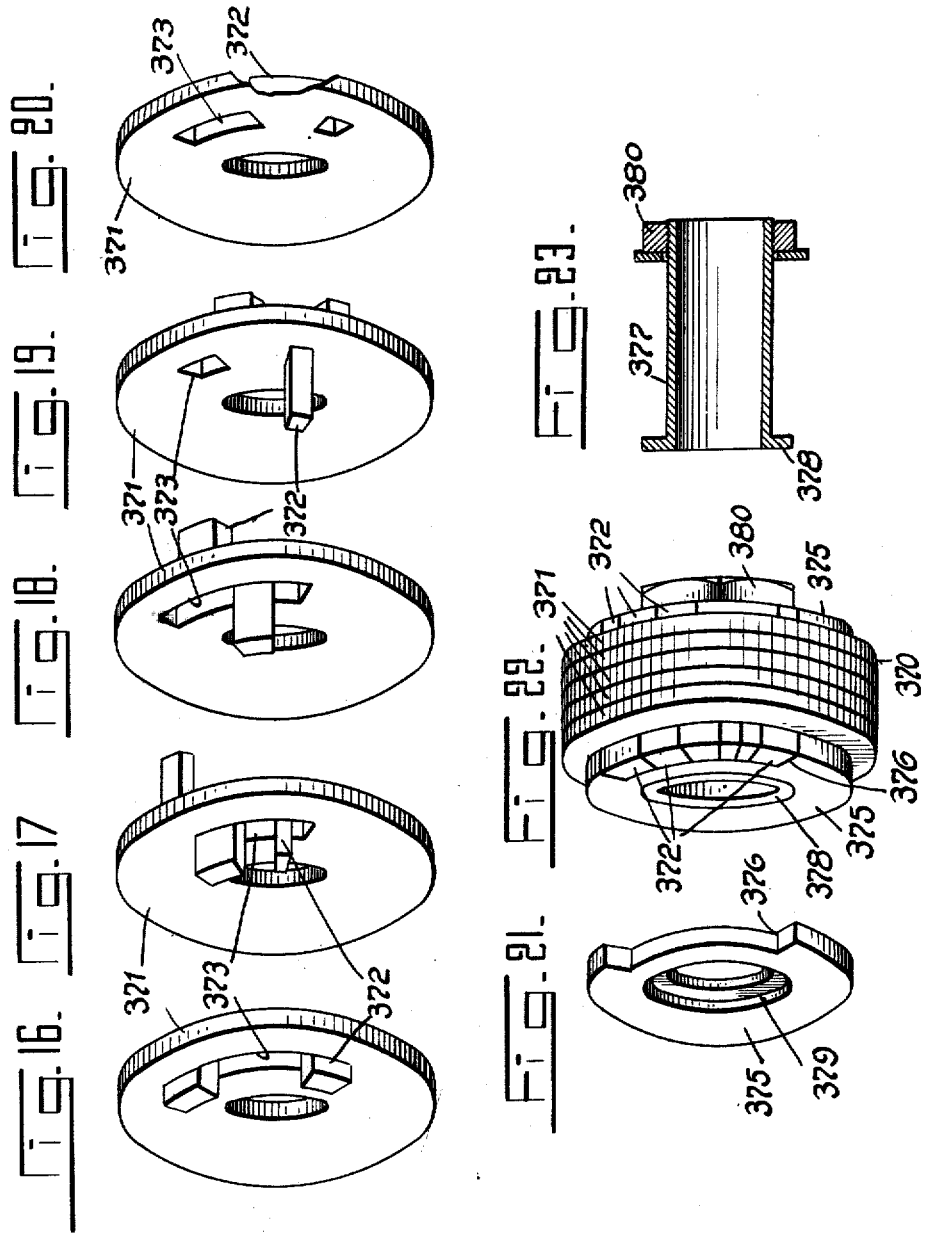

M. M. GOLDBERG.
REGISTERING AND RECORDING MECHANISM.
APPLICATION FILED JULY 6, 1915.
1,327,153.
Patented Jan. 6, 1920.
17 SHEETS—SHEET 15.
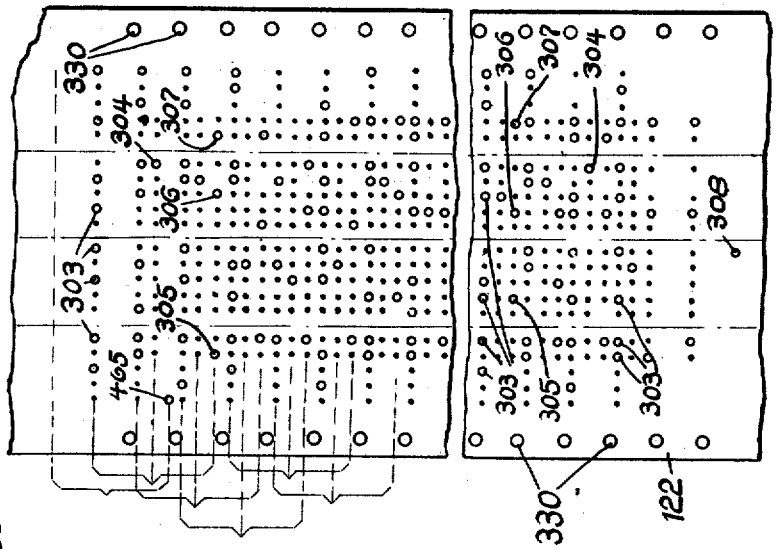
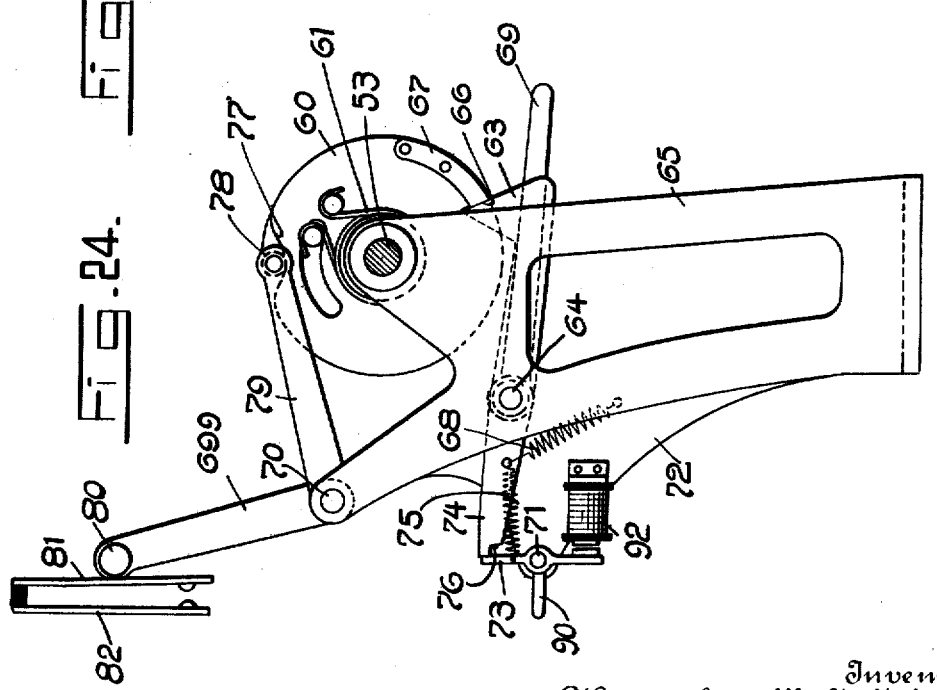
Inventor
Maximilian M. Goldberg.
Earl Beust
Attorneys M. M. GOLDBERG.
REGISTERING AND RECORDING MECHANISM.
APPLICATION FILED JULY 6, 1915.

1,327,153.                                      Patented Jan. 6, 1920.
                                                   17 SHEETS—SHEET 16.

| | CASH | CHARGE | C. O. D. | TOTAL | REGISTER No |
|---|---|---|---|---|---|
| A | 350.50 | 050.75 | 150.00 | 0551.25 | 95 |
| | | | | | DEPARTMENTS |
| B | 225.00 | 105.50 | 200.00 | 0530.50 | I 01206.75 |
| C | 100.00 | 000.00 | 025.00 | 0125.00 | II 00220.00 |
| D | 050.00 | 005.00 | 005.00 | 0060.00 | III 00625.00 |
| E | 070.00 | 025.00 | 010.00 | 0105.00 | IV 00225.00 |
| F | 025.00 | 030.00 | 000.00 | 0055.00 | V 00420.75 |
| G | 400.00 | 075.00 | 000.00 | 0475.00 | VI 00208.00 |
| | | | | | CASHIERS |
| H | 025.00 | 050.00 | 075.00 | 0150.00 | 1 01801.10 |
| K | 075.00 | 000.00 | 000.00 | 0075.00 | 2 00699.25 |
| I | 100.00 | 025.00 | 025.00 | 0150.00 | 3 00405.15 |
| | | | | | GRAND |
| M | 300.00 | 000.00 | 010.00 | 0310.00 | TOTALS |
| N | 100.00 | 005.00 | 005.75 | 0110.75 | CASH 01961.50 |
| O | 075.50 | 047.00 | 000.00 | 0122.50 | CHRG. 00438.25 |
| P | 065.50 | 020.00 | 000.00 | 0085.50 | C.O.D. 00505.75 |

Inventor
Maximilian M. Goldberg
Carl Benst
Attorneys

M. M. GOLDBERG.
REGISTERING AND RECORDING MECHANISM.
APPLICATION FILED JULY 6, 1915.

1,327,153.

Patented Jan. 6, 1920.
17 SHEETS—SHEET 17.

Inventor
Maximilian M Goldberg
by R. ...
Karl Benst
Attorneys

UNITED STATES PATENT OFFICE.

MAXIMILIAN M. GOLDBERG, OF DAYTON, OHIO, ASSIGNOR TO THE NATIONAL CASH REGISTER COMPANY, OF DAYTON, OHIO.

REGISTERING AND RECORDING MECHANISM.

1,327,153.　　　　　　　Specification of Letters Patent.　　　Patented Jan. 6, 1920.

Application filed July 6, 1915. Serial No. 38,250.

*To all whom it may concern:*

Be it known that I, MAXIMILIAN M. GOLDBERG, a citizen of the United States, residing at Dayton, in the county of Montgomery and State of Ohio, have invented certain new and useful Improvements in Registering and Recording Mechanism, of which I declare the following to be a full, clear, and exact description.

The great desideratum in large commercial establishments having a number of departments with a number of clerks in each department is to be able quickly to ascertain the amount of business done by each clerk, in each department, and under each cashier, and to obtain detailed information as to the amount of the different kinds of business, such as cash and credit, transacted. At the present time in large commercial establishments, such as department stores, where duplicate sales slips are made out for each purchase a part of each slip being given to the customer as the receipt for the amount of purchase, while the duplicate portion thereof is retained in the store, these clerks' cashiers', and department totals and the totals of the transactions of different classes are ascertained by the auditing force checking over the duplicates. By this method of ascertaining the various totals it will be obvious that a considerable force is required for the auditing of these slips and it is the principal object of this invention to provide means upon which a record is made at the time of the sale which means afterward is used for controlling the entry of the amounts of the various sales upon a plurality of totalizers representing the various departments of the establishment, the clerks and cashiers assigned to the different departments and the various classes of transactions. In the preferred form of embodiment disclosed herein electrically operated means under the control of the record means is employed for controlling the selection of the totalizers for operation and for controlling the differential movement of the actuating means for the accumulators.

It is one of the objects of this invention to provide novel electrical means and circuits for controlling the differential movement of the actuating mechanism.

It is also an object of this invention to provide a simple and improved system of electrical wiring and connections for selecting the totalizers for operation under the control of the record means.

Incidental to the provision of electrical means and circuits for controlling the extent of movement of the actuating mechanism, it was one of the objects of this invention to produce but one momentary electrical impulse in each of the circuits upon each cycle of operation of the machine, one momentary impulse in a circuit being sufficient for the performance of the function of the circuit.

A still further object of this invention is to provide an improved recording mechanism comprising a printing drum which may be rolled over the totalizers to record the amounts accumulated on the latter.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings:—

Figures 1$^A$ and 1$^B$ combined constitute a front elevation of the machine embodying the present invention.

Figs. 2$^A$ and 2$^B$ combined constitute a top plan view of the machine and shows but one of the five rows of totalizers.

Figs. 3$^A$ and 3$^B$ combined constitute a longitudinal vertical section through the machine taken on the line A—A of Figs. 2$^A$ and 2$^B$.

Figs. 4$^A$ and 4$^B$ (Sheets 7 and 8) combined constitute an enlarged detail longitudinal sectional view taken through one of the rows of totalizers as on the line B—B of Figs. 2$^A$ and 2$^B$.

Figs. 5$^A$ and 5$^B$ (Sheets 7 and 8) combined constitute a full sized detail longitudinal vertical section taken along one of the differential units for a row of totalizers.

Figs. 6$^A$ and 6$^B$ combined constitute a detail longitudinal vertical section through the machine being taken on the line C—C of Fig. 7.

Fig. 7 is a detail transverse sectional view through the machine being taken on the line D—D of Fig. 2$^B$, and two of the rows of clerks' transaction totalizers being broken away.

Fig. 8 is an enlarged detail cross sectional view taken through three of the totalizers.

Fig. 9 is an enlarged detail top plan view of three of the totalizers.

Fig. 9^A is a detail view of one of the transfer units shown in tripped position.

Fig. 10 is a full sized detail end view of one of the commutators employed to complete a circuit under the control of the amount perforations in the record strip for energizing an electro-magnet normally maintaining an operative relation between the differential mechanism and the driving mechanism.

Fig. 11 is an enlarged cross sectional view through one of the commutators, the section being taken on the line F—F of Fig. 10.

Fig. 12 is a full sized cross sectional view through the contact pin box.

Fig. 13 is a transverse sectional view through one of the clutches normally connecting one of the differentially rotatable shafts to the driving mechanism.

Fig. 14 is a transverse vertical section taken through the record strip storage roll and shows the frictional device for driving the same.

Fig. 15 is a cross sectional view through the devices controlled by the perforations in the record strip representing the classes of transactions for selectively establishing electrical connections between the electro-magnets retaining the row of clerks' totalizers, employed to accumulate the individual clerk's cash, charge and C. O. D. transactions, out of engagement with the actuating racks.

Figs. 16 to 20 inclusive, are enlarged perspective views of the conducting disks comprising one of the commutators.

Fig. 21 is an enlarged perspective view of one of the end disks of a commutator.

Fig. 22 is an enlarged perspective view of one of the assembled commutators.

Fig. 23 is an enlarged detail cross sectional view through the sleeve upon which one of the commutators is mounted.

Fig. 24 is a detail cross sectional view taken on the line G—G of Fig. 2^A and showing the motor locking device and the means for closing the motor circuit.

Fig. 25 is a top plan view of a portion of the perforated record strip.

Figures 26, 27:
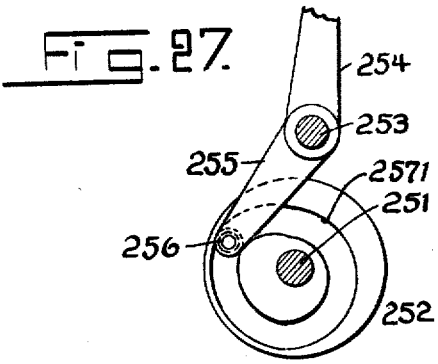

Fig. 26 shows an illustrative form of record printed from the totalizers.

Fig. 27 is a detail view of one of the cams and levers for operating resetting bars for the totalizers.

Figure 28:
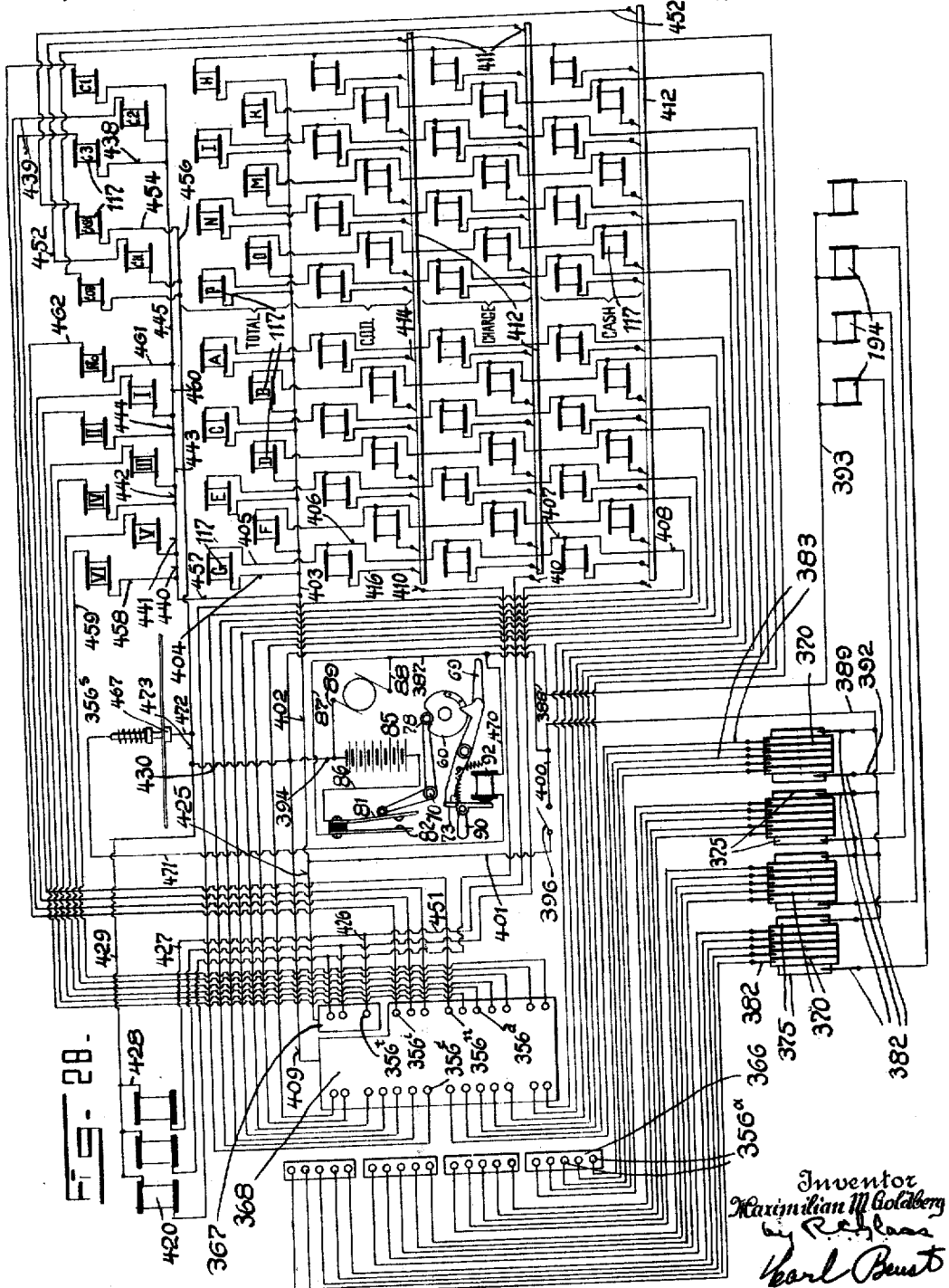

Fig. 28 is a diagrammatical view of the various electrical circuits and connections.

In order that the detailed description may be followed to better advantage a general statement will be given here of the operation of the specific embodiment of the invention shown and the system will be described as being applied to department stores, but it is to be understood that the invention about to be described may with equal facility be used in any other large commercial establishments and in many other relations. The invention as a whole or any part thereof is, therefore, capable of use in other embodiments without constituting a departure from the scope of the invention.

At the present time a great many of the large department stores have employed cashier-inspectors each having several departments assigned to them. As each sale is made the clerk forwards the goods and sales slip to the cashier-inspector, who is conveniently located, and it is the duty of the cashier-inspector to compare the goods with the entries made on the sales slip. If they correspond one portion of the sales slip is wrapped with the goods and returned to the clerk who hands them to the customer while the other portion of the slip having thereon a duplicate of the data entered upon the sales slip wrapped with the goods is retained by the cashier-inspector. The latter at the end of the day turns them in to the auditing department so that they may be audited in order to ascertain the departmental, the cashiers', and clerks' totals, and the totals of the different classes of transactions. In a great many instances these cashiers are provided with machines which record the total of the purchases upon the original and duplicate portions of the sales slips.

This cashier-inspector system, just described, so far as it goes is good for department stores but the serious objection to this system is that it requires a large auditing force in order to find out the various totals.

With the present system described herein a record controlled strip is used which strip is perforated at various positions by any suitable mechanism at the time of making the sale or at any other desired time, the perforations for each sale in accordance to their location representing the clerk making the sale, the department to which the clerk belongs, the cashier under which the clerk operates, the class of transactions to which the sale belongs, and the amount of the sale. Each sale thus handled by the cashier inspector would be entered upon this strip which at the close of the day's business is taken to the auditors' department and run through the machine of the present invention.

In the present invention there is one "cash", one "charge", one "C. O. D." and one grand totalizer for each clerk, one totalizer for each department, one totalizer for each cashier, and one grand totalizer for each class of transactions. There is also one totalizer or accounting device in which the number of the perforating machine from which the record strip is taken is entered. Application for Letters Patent of the United States, Serial No. 86087, filed Mar. 23, 1916, by Maximilian M. Goldberg fully shows and describes a perforating machine adapted to perforate a record strip for controlling the machine embodying the present invention. The totalizers in the present invention are arranged in rows and actuating mechanisms comprising sets of racks, are provided for each row.

The actuating racks of like denomination are moved differentially and to like extents by differentially rotatable shafts common thereto. The differentially rotatable shafts are driven through clutch mechanisms by the driving mechanism. The totalizers are retained out of engagement with the racks during the differential movement of the latter from normal position by electro-magnets. The driving mechanism of the machine is continuously operated while the record strip is run through the machine, the machine being automatically stopped under the control of the record strip when the last perforated record in the record strip is registered in the machine. Upon each cycle of operation of the machine, contact pins are lowered and those pins which are in line or registry with the perforations in the strip pass through the same and contact with contact plates under the strip. Commutator devices, one for each denominational series of amount contact pins are rotated by the driving mechanism and when these devices have moved extents corresponding to the amounts represented by the perforations through which the amount contact pins pass, they complete electric circuits to energize electro-magnets which, when energized, effect the disconnection of the clutches through which the driving mechanism rotates the differentially rotatable shafts for the sets of actuating racks. In this manner the shafts and the sets of racks are arrested in different positions corresponding to the perforations representing the amount.

After the sets of actuating racks have been differentially positioned and before they begin their return movement to normal position, a switch is closed to complete circuits through the electro-magnets retaining the totalizers corresponding to the contact pins passing through the perforations representing the totalizers out of engagement with the sets of actuating racks. When these electro-magnets for the totalizers are energized the totalizers move into engagement with the racks so that when the latter are restored to normal position they will enter on the engaged totalizers the amount of the transaction. After the actuating racks have been restored to normal position the contact pins are elevated and the strip is fed so as to bring the perforations of the next record into position to control the machine upon the next cycle of operation of the latter.

The totalizers are adapted to print a record on a sheet of paper. The paper is wrapped about a printing drum mounted in a sliding frame, which is adapted to be moved over the totalizers. When it is desired to print from the totalizers the frame is manually moved across the totalizers, the drum being rotated through a rack and gear so that the paper rolls over the totalizers to print from the latter.

All of the totalizers may be reset simultaneously to zero position after each record strip or any number of record strips is run through the machine. For this purpose a manually operated device has suitable connections to the resetting devices for the totalizers to rotate the latter to zero whenever the manually operated device is operated.

*Operating mechanism.*

The machine for illustrative purposes is shown as equipped with an electric motor of the well known type shown and described in Letters Patent of the United States, No. 923,857, granted to Charles F. Kettering on June 8, 1909, together with the Letters Patent of the United States No. 1,144,418, granted to Charles F. Kettering and Wm. A. Chryst June 29, 1915. It is not considered necessary to describe the motor in detail here as a detailed description of the same may be had by reference to the above mentioned patents. It is to be understood that it is not intended to limit the present invention to use with the particular electric motor shown and described or to use with any electric motor at all as it is obvious that any suitable form of operating mechanism may be employed.

The armature (not shown) of the motor 49 (Fig. 1ᴬ) is fastened on a shaft 50 integral with a worm 51 which meshes with a curved worm-wheel or gear 52. The worm-gear 52 is loosely mounted on a shaft 53 (Figs. 1ᴬ and 2ᴬ) which is supported near its left hand end in a frame 54 and near its right hand end in an arm or bracket 55 projecting from a front frame 56 of the machine. The worm-gear 52 is rigidly connected to a hollow clutch member 57 within which is rigidly mounted on the shaft 53 a second clutch member (not shown). Rigidly mounted on the shaft 53 is a disk 58 and a disk 59 loose on the shaft 53 carries rollers (not shown) coöperating with spring plungers (not shown) for connecting the two clutch members together when the disk 59 is moved relatively to the disk 58 by the spring plungers upon release of the machine. A disk 60 is also loosely mounted on the shaft 53 and is connected to the disk 58 by the spring 61 (Figs. 2ᴬ and 24) in such a manner that when the machine is released the disk 60 is moved relatively to the disk 58 by the spring 61.

An arm 63 (Figs. 1ᴬ, 2ᴬ and 24) is rigidly mounted on a shaft 64 supported near its left hand end in the frame 54 and at its right hand end in a frame 65 and the arm 63 is provided with projections 66 which engage a block 67 on the disk 60 and shoulders on the disks 58 and 59. A spring 68, connected at one end to an arm 74 fast on the shaft 64 and at its opposite end to the frame 72 serves to retain the arm 63 in its normal locking position. When it is desired to operate the machine the auditor, having charge of the machine, operates a hand lever 69 fast on the shaft 64 to rock the arm 63 out of locking engagement with the disks 58, 59 and 60, whereupon the motor clutch is connected so that the motor may operate the machine.

A shaft 71 (Figs. 1ᴬ, 2ᴬ and 24) which is supported by the frame 54 and the frame 72 carries a lever 73 the upper end of which normally engages the forward end of an arm 74 rigidly mounted on the shaft 64. When the shaft 64 and the arm 63 are rocked to release the machine, as above described, the forward end of the arm 74 is raised out of engagement with the lever 73 and a spring 75 connected to the lever 73 and to the arm 74 rocks the shaft 71 and the lever 73 clockwise as viewed in Fig. 24 so that the upper end of the lever 73 is carried into engagement with a notch 76 formed in the arm 74. In this manner the arm 63 is retained out of locking position by the lever 73 while the record strip is being run through the machine.

The disks 58 and 60 are provided with curved recesses 77 (Fig. 24) formed in their peripheries and a roller 78 carried by an arm 79 fast on a shaft 70 mounted in the frames 65 and 72 rests in these recesses when the machine is not in operation. When the disk 60 is moved relative to the disk 58 upon the release of the machine, as above stated, the roller 78 is forced out of the notches in the disks 58 and 60 thereby rocking the arm 79 and shaft 70 counter clockwise as viewed in Fig. 24. The free end of an arm 699 fast on the shaft 70 carries an insulating stud 80 engaging a contact strip 81 and when the shaft 70 is rocked upon the release of the machine, as above described, the roller 80 forces the contact strip 81 into engagement with a contact strip 82 to complete a circuit through the motor for the purpose of operating the machine. Referring to Fig. 28, this circuit is as follows: from the battery 85, employed as the main source of electric energy for supplying current to all of the various circuits of the system, through wire 86, contact strips 81 and 82, wire 87, wire 88 through the motor armature, wire 89 back to the battery. If the operator should desire at any time to stop the machine before the record strip has been completely run through the machine he may rock the shaft 71 counter clockwise (Fig. 24) against the influence of the spring 75 by a hand lever 90, fast on the shaft 71, whereupon the spring 68 rocks the arm 63 to normal locking position to disconnect the clutch at the end of the cycle of the operation of the machine. At the same time the lever 79 is rocked by the contact spring 81 to normal position to break the above described circuit through the motor. When the last item or record on the record strip is entered in the machine an electromagnet 92 is energized under the control of the record strip, as will be described later. The downwardly extending arm of the lever 73 serves as an armature for the electro-magnet 92 so that when this electromagnet is energized the lever 73 is rocked counter clockwise to move its upper end out of the notch 76 in the arm 74 and thereby permit the lever 63 to be returned to normal locking position by the spring 68 and the motor circuit to be broken.

The shaft 53 at its right hand end (Figs. 1ᴬ, 2ᴬ and 7) carries a bevel gear 94 meshing with a bevel gear 95 mounted on the forward end of the main drive shaft 96 of the machine. This main drive shaft projects transversely through the machine and is journaled near its forward end in the front frame 56 of the machine and at its rear end in a rear frame 91 (Fig. 7) of the machine.

*Totalizers.*

There are five rows of totalizers (Figs. 2ᴬ, 3ᴬ, 3ᴮ, 6ᴬ, 6ᴮ and 7) arranged longitudinally across the machine. The last or rearmost row of totalizers (Figs. 6ᴬ and 6ᴮ) comprises thirteen totalizers and the other four rows each comprise fourteen totalizers. All five of these rows of totalizers are not shown in the drawings as they are all duplicates of each other except the last row of totalizers. However, in the diagrammatic view shown in Fig. 28, electric connections are shown for selecting the totalizers of all five rows for operation and in Fig. 26 the record printed from the totalizers shows that there are five rows of totalizers in the illustrative form of embodiment described herein. Half of the totalizers of each row are arranged to the right of the main drive shaft 96 and the other half of the totalizers of the rows are arranged to the left of the main drive shaft. Each row of totalizers is mounted between a corresponding pair of frames 99 (Figs. 6ᴬ, 6ᴮ and 7) there being one pair of frames for each row of totalizers except the front and back row of totalizers. The front row of totalizers is supported between the front frame 56 of the machine and one of the frames 99 and the back row of totalizers is supported between the back frame 91 of the machine and one of the frames 99. The rows of totalizers are mounted in independent pairs of frames, as just described, so that the number of rows of totalizers may be easily and quickly increased or diminished in accordance with the needs of any particular establishment by merely adding or removing one or more rows of totalizers as desired without disturbing the arrangement of the other rows of totalizers.

The first, second and third rows of totalizers from the front are employed respectively to accumulate the clerk's individual cash sales, charge sales, and C. O. D. sales and the fourth row is employed to accumulate the individual clerk's totals of the sales of all classes of transactions. As shown by the designations in Figs. 6$^A$ and 6$^B$ there are six totalizers in the rear row for accumulating the total sales of each department, three for totalizing the individual totals of the sales handled by the cashiers and three for accumulating the grand totals of the different classes of transactions. There is also one totalizer for recording the number of the perforating machine employed to perforate the record strip and from which the record strip is taken.

Each totalizer comprises a plurality of registering wheels 103 rigid with pinions 104 (Figs. 2$^A$, 4$^A$ and 4$^B$, 5$^A$ and 5$^B$, 7, 8 and 9), the wheels and pinions being loosely mounted on a shaft 105 mounted in an individual totalizer frame comprising a lever 107 and a bell crank lever 108 loosely mounted on studs 109 projecting from the frames 56, 99 and 91 between which the totalizers are mounted. The levers 107 and 108 for seven of the totalizers of one row support respectively the rear and front ends of the totalizer shafts 105 and the levers 107 and 108 for the other totalizers of the row support respectively the front and rear ends of the totalizer shafts, the levers being alternately arranged in this manner. Pivotally mounted at 110 on each lever 107 is a lever 111 which engages under the projecting end of the corresponding totalizer shaft 105 to hold the totalizer out of engagement with the actuating racks 112, which will be described later. It can be seen that the levers 107 and 108 and the levers 111 for a row of totalizers are alternately arranged to permit the totalizers to be positioned closer together.

Each lever 111 at its lower end has a flange or projection 114 (Figs. 3$^A$, 3$^B$, 4$^A$ and 4$^B$) normally in engagement with a nose 115 formed on one of the sides of a yoke shaped armature 116 for a corresponding electro-magnet 117. It is understood, of course, that there is one of these electromagnets and armatures 116 for each totalizer. The electro-magnets for each row of totalizers are arranged in two longitudinal rows as shown in Figs. 2$^B$ and 7. The armatures 116 are loosely mounted on cross rods 118 supported at their ends in the frames 56, 91 and 99, supporting the rows of totalizers. Springs 120, (Figs. 3$^A$ and 3$^B$,) connected at their upper ends to the armatures 116 and at their lower ends to frames or bars 121 supporting the electro-magnets 117 tend to rock the armatures counter clockwise as viewed in the above figures, and thereby retain the noses 115 on the armatures 116 in engagement with the flanges 114 on the levers 111. From this construction it can be seen that as the levers 111 are pivoted on the totalizer frames and engage under the totalizer shafts 105 the engagement of their flanges 114 with the noses 115 on the corresponding armatures 116 serves to hold the totalizers out of engagement with the actuating racks 112.

The electro-magnets 117 are selectively energized under the control of perforations in a record strip 122 (Figs. 2$^B$ and 25) as will be described later. Upon the energization of an electro-magnet 117 it attracts its armature 116 thereby rocking the latter so that its nose 115 is carried out of engagement with the flange 114 on the lever 111.

The side of each armature 116 having the nose 115 also carries a pin 124 which projects over a projection 125 on the corresponding lever 111. When the armature 116 is attracted by its electro-magnet 117 the pin 124 engages the upper inclined edge of the projection 125 on the lever 111 thereby rocking the latter counter clockwise (Figs. 4$^A$ and 4$^B$). Gravity might be depended upon to rock the levers 111 when the electro-magnets are energized, but in order to make this operation of the levers more certain and quicker the pins 124 for engaging the projection 125 on the levers 111 are provided. When a lever 111 is rocked in this manner a recess 127 formed in the lever 111 engages a corresponding pin 128, projecting from a vertical projection 129 on a bar 130. When a lever 111 is rocked to this position the totalizer frame is free to rock to move the totalizer into engagement with the actuating racks 112. The force of gravity or springs might be depended upon to rock the totalizers into engagement with the actuating racks but in order positively to insure such engagement and to dispense with the use of springs the bar 130 is moved, as will be described presently, slightly toward the right immediately after the lever 111 has been rocked, so that the corresponding pin 128 through its engagement with the notch 127 in the lever 111 moves the latter to the right thereby swinging the totalizer frame to move the totalizer into engagement with the actuating racks 112.

As the levers 111 for a row of totalizers are alternately arranged, as above described, it is necessary to provide two bars 130 for each row of totalizers (Figs. 2B, 7 and 9). Each bar is mounted on grooved rollers 131 (Figs. 4A, 4B, 7, 8 and 9) mounted on studs 132 projecting from the frames 56, 91 and 99, and the bars are guided by grooved rollers 133 mounted on cross rods 134 supported at their ends in these frames. Each bar 130 carries a roller 137 (Fig. 4A) projecting into a recess in the lower end of a corresponding arm 138 and a roller 139 (Fig. 4B) projecting into a recess in the lower end of a corresponding arm 140. The arms 138 and 140 are loosely mounted on cross rods 141. The arm 140 of each pair of arms 138 and 140 carries a roller 142 coöperating with the periphery of a corresponding cam disk 143 fast on the main drive shaft 96 and the other arm 138 of the pair carries a roller 144 coöperating with the periphery of a corresponding cam disk 145 also fast on the main drive shaft. These cam disks 143 and 145 are so formed that immediately after the selected electro-magnets 117 are energized the bars 130 are moved slightly toward the right to move the selected totalizers into engagement with the actuating racks, as above described. After the engaged totalizers have been actuated by the actuating racks 112, as will be described later, the pairs of cams 143 and 145 move the bars 130 to the left past normal position so that pins 147 on the bars 130 engage the levers 111 to rock the levers 111 and therefore the totalizers to normal position. As the electro-magnets 117 are deënergized before the levers 111 are moved to normal position the springs 120 (Figs. 3A and 3B) move the armatures to normal position to retain the totalizers out of engagement with the actuating racks until their corresponding electro-magnets are again energized.

Bell crank levers 148, (Figs. 2A, 4A, 4B and 8) one for each totalizer wheel, are rigidly mounted on shafts 149, journaled at their ends in the frames 56, 99, and 91, there being one shaft for each totalizer. The horizontal arms of the bell crank levers 148 are provided with noses normally engaging the pinions 104 integral with the totalizer wheels to aline the latter in their proper positions. When a totalizer is rocked into engagement with the actuating racks the teeth of the pinions 104 begin to engage the teeth of the actuating racks before the pinions are moved completely out of mesh with the noses of the alining pawls so that the totalizer wheels are prevented from being accidentally rotated while they are being moved into and out of engagement with the actuating racks.

*Actuating mechanism.*

There are two sets of actuating racks 112 (Figs. 2A, 2B, 5A, 5B, 7, 8 and 9) for each longitudinal row of totalizers, one set being common to the seven totalizers on one side of the drive shaft 96 and the other being common to the seven totalizers on the other side of the drive shaft. The actuating racks have slots 152 straddling grooved rollers loosely mounted on the cross rods 134. The actuating racks 112 on the opposite sides of the main drive shaft, of the like denominations and actuated differentially under the control of the record strip, are connected together by racks 153. Four of the actuating racks of each set are moved differentially under the control of the perforated record strip. The remaining actuating racks which actuate the totalizer wheels of highest orders and which are moved one step by the driving mechanism to effect transfers, as will be described later, are connected together by bars 166. The racks 112 are connected to the racks 153 and bars 166 by corresponding transfer levers 154, which are pivotally mounted on pins 155 carried by the racks 112 and projecting through horizontal slots 156 in the racks 153 and bars 166. The transfer levers 154 carry pins 157 which project through vertical slots 158 in the racks 112 and through inverted L-shaped slots 159 in the racks 153 and bars 166.

The racks 153 mesh with pinions 160 (Figs. 2A, 2B, 5A, 5B, 6A, 6B and 7) rigidly mounted on shafts 161 extending rearwardly through the machine. The shafts 161 are journaled at their forward ends in a cross bar 163 of a frame 164 (best shown in Fig. 7) and at their rear ends are mounted in a cross bar 165 of the frame 164. There is one shaft for the racks 153 of each of the four denominations represented by perforations in the record strip. Each shaft carries five pinions, one for each rack 153 of the same denomination in the sets of racks for the rows of totalizers. Counting from the left in Figs. 2A and 2B, the second and fourth shafts 161, which carry the pinions 160 for actuating the tens and thousands racks 153 respectively have sleeves 167 loosely mounted on their forward ends. On the forward ends of the sleeves 167 are rigidly mounted pinions 168 and on the rear ends of the sleeves are clutch disks 169. The first and third shafts 161, which carry the pinions 160 meshing with the units and hundreds actuating racks 153 respectively, loosely carry the corresponding clutch disks 169, upon which are rigidly mounted the appropriate pinions 168, as best shown in Fig. 13. The pinions 168 mesh with corresponding segment gears 170 loosely mounted on shafts 171 journaled in two cross bars 172 of the frame 164 (Fig. 7). Each segment gear 170 carries a roller 179 projecting into a cam groove 173 (Figs. 1ᴬ and 1ᴮ) formed in the periphery of a corresponding disk or drum 174, rigidly mounted on a shaft 175 which is mounted in the frame 164. The shaft 175 on its left hand end carries a gear 176 (Figs. 1ᴬ, 2ᴬ and 7) meshing with an intermediate gear 177 which in turn meshes with a gear wheel 178 fast on the shaft 53. Through these gears the shaft 175 is given one complete rotation in the direction indicated by the arrows in Figs. 1ᴬ and 7, upon each rotation of the shaft 53. The cam grooves 173 are constructed to rock the clutch disks 169 through segment gears 170 and pinions 168 an invariable distance first clockwise (Figs. 1ᴬ and 1ᴮ) and then counter clockwise to normal position upon each rotation of the shaft 175.

Clutch disks 181 (Figs. 2ᴬ, 2ᴮ and 7) are rigidly mounted on sleeves 182 (Figs. 3ᴬ, 3ᴮ and 13) integral with locking disks 183 having saw teeth 184. The locking disks 183 are splined at 180 on the shafts 161 so that the locking disks 183 and the clutch disks 181 are rotated with the shafts 161 but are adapted to be moved longitudinally of the shafts. Loosely mounted on each sleeve 182 are two curved members 186 which encircle the sleeve and are rigidly connected together. The members 186 have diametrically oppositely extending pins 187 (Figs. 2ᴬ, 2ᴮ, 3ᴬ, 3ᴮ, and 7) projecting laterally into the upper bifurcated ends of the side arms of yoke members 188 loosely mounted on studs 189 projecting from upright portions 190 of the frame 164. Each member 188 has a rearwardly extending arm 191 (Fig. 7) and these rearwardly extending arms 191 have projections or shoulders 192 engaging the upper ends of armatures 193 of corresponding electro-magnets 194. Springs 195 normally retain the armatures 193 in the position shown in Fig. 7 and springs 196 tend to rock the members 188, clockwise but such movement is normally prevented by the armatures 193.

From the above description it can be seen that as the clutch disks 181 are normally in engagement with the clutch disks 169 the clutch disks 181 and, therefore, the shafts 161 upon which the latter are splined, are rotated from normal position with the clutch disks 169, the clutch disks 181 being prevented from being slid on the shafts 161 out of engagement with disks 169 by the engagement of the armatures 193 under the shoulders 192 on arms 191 of the members 188. Rotation of the shafts 161 from normal position through the pinions 160 fast on the shafts moves the racks 153 and the actuating racks 112 toward the right. At different points during the rotation of the clutch disks 169 from normal position the electro-magnets 194 are energized under the control of perforations in the record strip. When a disk 169 has been rotated one more step than the number of steps corresponding to the digit of the corresponding denomination in the amount represented by the perforations in the record strip the appropriate electro-magnet 194 is energized whereupon it attracts its armature 193 to withdraw it from engagement with the shoulder 192 on the arm 191 of the corresponding member 188. Then the spring 196 for the member 188 immediately rocks the latter to shift the clutch disk 181 and the locking disk 183 rearwardly on the shaft 161, the saw teeth on the locking disk 183 thereby being moved into mesh with the saw teeth of a corresponding locking disk 199 rigidly mounted on a cross bar 197 of the frame 164 (Figs. 7 and 13). When the clutch disk 181 and the locking disk 183 are moved rearwardly on the shaft 161 the latter is uncoupled from the clutch disk 169 and is locked from further rotation by the coöperating locking disks 183 and 199, the clutch disk 169 being permitted to continue its invariable movement independent of the clutch disk 181 and shaft 161. The shafts 161 and therefore the racks 153 are moved an additional step for the purpose of effecting transfers from totalizer wheels of lower order to those of higher order as will be later described.

Because of the coöperating surfaces 200 of the clutch disks 169 and 181 (Fig. 7) the disks 169, during their rotation from normal position tend to move the disks 181 rearwardly on the shafts 161 so that when the armatures 193 are attracted by the electro-magnets 194 the disks 169 assist the springs 196 in moving the disks 181 and the locking disk 183 rearwardly on the shafts. During the return movement of the segment gears 170 and, therefore, of the disks 169 to normal position, points 201 on the disks 169 engage points 202 on the disks 181 and because of the inclination of the surfaces 203 forming these points and also because of the camming action of the teeth on the disks 183 and 199, the disks 169 and 181 are drawn together to normal relative position and therefore the disks 181 and the shafts 161 are returned to normal position. It will be readily seen that because of the inclination of the surfaces 203 on the disks 169 and 181 the speed of rotation of the disks 183 gradually increases until the disks 169 and 181 are completely drawn together, the speed of the disks then being the same. The electro-magnets 194 are deënergized during the return movement of the shafts 161 to normal position so that the springs 195 again draw the armatures 193 under the shoulders 192 on the arms 191 of the members 188 when the latter are moved to normal position.

The pins 157 on the transfer levers 154 (Figs. 6A and 9A) are normally in engagement with the right hand ends of the horizontal portions of the slots 159 in the racks 153 and the pins 155 are normally in engagement with the right hand ends of the slots 156 in the racks 153 so that when the latter are moved differentially toward the right as above described, their first step of movement is independent of the actuating racks 112. During this first step of movement springs 205, each of which is connected at one end to the corresponding actuating rack 112 and at the opposite end to the transfer lever 154, rock the transfer levers counter clockwise as viewed in the Figs. 6A and 9A, to lower the pins 157 in the vertical portions of the L-shaped slots 159 formed in the racks 153, so that the transfer levers rigidly lock the racks 112 and the racks 153 together whereby the racks 112 are moved an extent commensurate with the amount to be entered in the totalizers.

After the shafts 161 and therefore the racks 153 and corresponding actuating racks 112 are differentially positioned and before they begin their return movement to normal position, the electro-magnets 117 for the desired totalizers are energized under the control of perforations in the record strip so that the selected totalizers are rocked into engagement with the actuating racks as above described. On return movement of the actuating racks to normal position the engaged totalizers are operated accordingly and after the racks have been restored to normal position the totalizers are moved out of engagement therewith as already described.

*Transfer mechanism.*

When a transfer is not required a vertical projection 206 (Figs. 6A and 9A) on the transfer lever 154 engages the right hand end of a lever 207 loosely mounted on one of the shafts 134 as the corresponding actuating rack 112 approaches zero position, whereby the transfer lever is rocked to raise the pin 157 carried thereby into the upper part of the slot 159 in the rack 153, the rack 112 being arrested at zero position in this manner while the rack 153 is moved an extra step to normal position. When a transfer from a pinion of lower order to a pinion of higher order is required the arm 207 for arresting the actuating rack for the pinion of higher order in zero position is rocked out of the path of the projection 206 on the transfer lever 154 carried by this rack so that the pin 157 on the transfer lever remains in engagement with the lower end of the vertical portion of the slot 159 of the rack 153, the actuating rack 112 for the rack 153 of higher order thereby being moved one step past zero movement with the rack 153.

The means for controlling the movement of the levers 207 out of normal position so that they will not arrest the corresponding actuating racks 112 in zero position when transfers are required, will now be described. Springs 209 (Figs. 5A, 5B and 9A) are connected at one end to the levers 207 and at their opposite end to levers 210 loosely mounted on cross rods 211 supported at their ends in the frames 56, 91 and 99. Each spring 209 tends to rock its corresponding lever 207 counter clockwise, as viewed in Figs. 5A, 5B, 6A and 9A, but such movement of the lever is normally prevented by the engagement of a nose 212 on the lever 210 under a shoulder 213 on the lever 207. The downwardly extending arm 214 of each lever 210 carries a roller 215 normally engaging a vertical edge 216 (Figs. 4A and 4B) formed in a transfer bar 217. There is one of these bars 217 for each rack 112, and each bar 217 except that for the rack 112 of highest denomination in a set of racks, engages the roller 215 carried by the lever 210 which normally retains its lever 207 in position to arrest the actuating rack for the totalizer pinions of the next higher denomination in normal zero position. The bar 217 for the rack 112 of highest denomination in a set of racks 112 is employed only for the purpose of alining the totalizer wheels of highest denomination in zero position during part of the operation of the resetting mechanism as will be described later. Each transfer bar 217 is pivotally hung on the lower ends of a corresponding pair of arms 218 one of which is loosely mounted on a cross rod 219 while the other is loosely mounted on one of the shafts 149. A heart-shaped cam 221 is rigid with each totalizer wheel. As a totalizer wheel passes from its "9" to its "0" position or beyond, the point of its cam 221 engages a curved projection 222 on the transfer bar 217 thereby swinging the transfer bar slightly toward the left. This movement of the transfer bar through its engagement with the roller 215 on the lever 210 rocks the latter to carry its nose 212 from engagement with the shoulder 213 on the lever 207, whereupon the spring 209 rocks the latter counter clockwise as viewed in Figs. 6A and 9A, to permit the actuating rack to be moved an extra step of movement past zero position to effect the required transfer. The cam grooves 173 (Figs. 1A and 1B) are so constructed that the segment gears 170, the clutch disks 169 and 181 and the shafts 161 are moved simultaneously from normal position but returned successively from lower to higher order to normal position for the purpose of effecting successive transfers as is well understood in the art.

Each transfer lever 154 has a notch or recess 224 (Figs. 5ᴀ, 5ᴮ and 6ᴀ) which normally engages a projection 225 on the corresponding lever 207. The left hand side or wall of the notch 224 is inclined so that when the rack 153 begins to move the actuating rack 112 from zero position the lever 154 is positively rocked so that its pin 157 is lowered in the slots 158 and 159. When one of the levers 207 is tripped its left hand end engages the upper edge of the transfer lever 154 during the last step of movement of the rack 153 to assist the spring 205 in maintaining the transfer lever in the position in which it locks the racks 153 and 112 together as shown in Fig. 9ᴀ.

For the purpose of transferring to the totalizer wheels which are of highest orders and for which no operating shaft 160 and pinions 161 are provided, the bars 166 (Figs. 5ᴀ, 5ᴮ and 7) are mounted on the actuating racks 112 for these pinions of highest orders, as above stated, in the same manner as the racks 153 are mounted on their corresponding racks 112. The transfer levers 154 carried by these actuating racks 112 upon which the bars 166 are mounted are identical with the transfer levers connecting the actuating racks 112 and the racks 153 and these transfer levers are controlled and operated in the same manner. Each bar 166 carries two rollers 223 and 226 projecting respectively into the recesses in the lower ends of arms 227 and 228, loosely mounted on the cross rods 141. The arm 227 carries a roller 229 engaging the periphery of a cam disk 230 and the arm 220 carries a roller 241 coöperating with the periphery of a cam disk 231. These pairs of cam disks 230 and 231 are rigidly mounted on the main drive shaft 96 and are so constructed as to move the bars 166 for each row of totalizers one step toward the right near the beginning of the cycle of operation, and then restore them successively from lower to higher order to normal position, after the rack 153 of highest order has been restored to normal position. In Figs. 5ᴀ and 5ᴮ the bar 166 is shown in its moved position, that is, it has been moved one step toward the right. Normally the roller 241 (Fig. 5ᴮ) rests in recess 2411 (Fig. 5ᴀ) of the cam 230 and the roller 229 (Fig. 5ᴀ) engages the projection 2311 (Fig. 5ᴮ) on the cam 231. When the bars 166 are moved to normal position the corresponding actuating racks 112 are prevented from moving this extra step by engagement of the projections 206 on the transfer levers 154 with the corresponding levers 207. It can be readily seen, however, that if a lever 207 has been rocked when a transfer is required the transfer lever 154 is not rocked and, therefore, the corresponding actuating rack 212 is moved one step past zero position with the bar 166 to accomplish the required transfer.

For the purpose of restoring the tripped levers 207 to normal position during the differential movement of the actuating racks 112 toward the right at the next succeeding cycle of operation of the machine the following described devices are employed. Restoring bars 232, (Figs. 5ᴀ, 5ᴮ, 6ᴀ and 9) one for each group of levers 207, project under the latter. Each bar 232 is supported at its forward end by an arm 2331 (Figs. 6ᴀ and 9ᴀ) and at its rear end by a lever 233 (Figs. 5ᴀ, 5ᴮ, 6ᴀ and 9ᴀ) the lever 234 and arm 233 being loosely mounted on one of the cross rods 134. The downwardly extending arms of the two levers 233 for each row of totalizers are connected together by a corresponding link 235. Each link 235 carries a pin 236 (Fig. 5ᴮ) projecting into a recess formed in the lower end of an arm 237 loosely mounted on the cross rod 141. The arm 237 carries a roller 238, projecting into a cam groove 239 (Figs. 5ᴀ and 5ᴮ) formed in the face of a disk 240 (Figs. 2ᴀ and 2ᴮ) fast on the shaft 96. The cam groove 239 is so formed that the link 235 is moved toward the left during the differential movement of the actuating racks 112 toward the right, whereby the arms 233 are rocked to raise the restoring rods 232. When these restoring rods are raised in this manner they engage the levers 207 which have been tripped and restore them to normal position, and the corresponding levers 210 retain the levers 207 in normal position when the restoring bars 232 are lowered.

Thirteen totalizers, as above stated, are included in the last or rearmost row of totalizers, (Figs. 6ᴀ and 6ᴮ). The first three totalizers counting toward the right and from the main drive shaft 96, (Fig. 6ᴮ), segregate the grand totals of the different classes of transactions and the other three totalizers on this side of the shaft accumulate the cashiers' totals. One of these grand transaction totalizers and one of the cashiers' totalizers are selected for operation upon each cycle of operation of the machine and it is, therefore, necessary to provide separate actuating racks and transfer mechanisms for the cashiers' totalizers and for the transaction totalizers. These actuating racks and transfer mechanisms for the transaction and cashiers' totalizers are identical to those above described for the other totalizers except that the actuating racks and the transfer bars for the transaction totalizers and the cashiers' totalizers are shorter. The actuating racks 242 for the transaction totalizers are mounted on grooved rollers on one of the cross rods 134 and a cross rod 243, and the actuating racks 244 for the cashiers' totalizers are mounted on grooved rollers on one of the cross rods 134 and a cross rod 245. The transfer bars 246 for the transaction totalizers and the transfer bars 247 for the cashiers' totalizers are operated in the same manner as are the transfer bars 217 for the other totalizers. The racks 153 and the bars 166 for the rearmost row of totalizers are extended toward the right and the racks for the transaction totalizers and cashiers' totalizers are connected to these racks 153 and bars 166 by their corresponding transfer levers 154. The levers 207 for the cashiers' totalizers are mounted on the cross rod 245. It is obvious from this description that the cashiers' totalizers and the transaction totalizers are operated in the same manner as are the other totalizers, and it is, therefore, deemed unnecessary further to describe the operation of their actuating racks and transfer mechanism.

The link 235 for this rearmost row of totalizers is also extended toward the right so that it could be connected to the lever 233 supporting one end of the restoring rod 232 for the tripped levers 207 for the cashiers' totalizers. Therefore, the operation of this link 235, through the restoring bars 232, restores the levers 207 for the groups of racks 112 for actuating the departmental, the transaction and the cashiers' totalizers.

*Turn to zero mechanism.*

The totalizers are all reset to zero position whenever desired after one or more perforated record strips have been run through the machine, by the operation of a crank handle 250 (Figs. 2^A and 3^A). The crank handle is fast on a shaft 251, extending transversely through the machine. The shaft 251 carries five cam disks 252 (Figs. 2^A and 27) of like construction, there being one disk for each row of totalizers. Loosely mounted on a shaft 253 parallel to the shaft 251 are five levers 254 (Figs. 5^A and 27). The downwardly extending arms 255 of these levers 254 carry rollers 256 projecting into cam grooves 2571 formed in the corresponding disks 252. The vertical arms of the levers 254 are forked over pins 257 (Fig. 5^A) on corresponding resetting bars 258 (Figs. 5^A and 5^B) which are mounted to slide on grooved rollers on the cross rods 134. The resetting bars at their centers have slots 259 through which the main drive shaft 96 passes. Each resetting bar 258 has a number of sets of teeth 260 there being one set of teeth for each totalizer and these sets of teeth mesh with corresponding segment gears 261, fast on the shafts 149 carrying the bell crank levers 148.

The cam grooves 2571 are so shaped that when the crank handle is given one complete rotation the levers 254 are rocked to move the resetting bars 258 an invariable distance toward the left, and then restore the bars to normal position. Such movement of the bars through the meshing of their sets of teeth 260 with the segment gears 261 rocks the shafts 149 and bell crank levers 148 clockwise (Figs. 4^A, 4^B, 5^A and 5^B) about 90 degrees and then counter clockwise to normal position. When the shafts 149 and the bell crank levers 148 are rocked clockwise in this manner the curved sides of the downwardly extending arms of these bell crank levers engage the peripheries of the heart-shaped cams 221 rigid with the totalizer wheels, thereby rotating the cams and the totalizer wheels in the shortest direction to zero position, the outer ends of the downwardly extending arms of the bell crank levers 148 being in engagement with the concave bases 263 (Fig. 4^B) of the heart-shaped cams when the latter reach zero position. Upon initial movement of the bell crank levers 148 to normal position, their downwardly extending arms pass out of engagement with the heart shaped cams 221, leaving the totalizer wheels in zero position and when the bell crank levers reach normal position the alining noses on their horizontal arms again engage the pinions 104 rigid with the totalizer wheels.

For the purpose of locking the totalizer wheels in zero position during the return movement of the bell crank levers 148 to normal, the transfer bars 217 and the transfer bars 246 and 247, for the grand transaction and cashiers' totalizers, are swung toward the right after the totalizer wheels are turned to zero position and before the levers 148 begin their return movement to normal position, to carry V-shaped notches 264 formed in the transfer bars into engagement with the points of the heart-shaped cams 221. To this end a pair of arms 265 (Figs. 3^A and 4^A) for each set of transfer bars 217 to the left of the main drive shaft 96, is rigidly mounted on the shaft 253 and a pair of arms 265 (Figs. 1^B, 3^B and 4^B) for each set of transfer bars 217 to the right of the main drive shaft 96 and for the transfer bars 246 is loosely mounted on the right hand shaft 161. The arms 265 of each pair support at their upper ends a cross rod 267 projecting into recesses 268 formed in the transfer bars. One of the arms 265 of each pair has rigidly connected thereto a downwardly extending arm 269 and the arms 269 for each row of totalizers are connected together by a corresponding link 270. The pair of arms 265 for the cashiers' totalizers (Fig. 6^B) are loosely mounted on a cross rod 271 and the link 270 for the rearmost row of totalizers including the cashiers' totalizers, is extended and at its right hand end is pivotally connected to the arm 269 for this pair of arms 265. The cross rods 267 are normally in engagement with the left hand side of the recesses 268 so that the transfer bars may be swung toward the left when transfers are required as fully described above. Two arms 276, (one of which is shown in Fig. 3ᴬ), are fast on the shaft 253 and at their lower ends carry rollers 277 projecting into cam grooves 278 formed in disks 275, fast on the shaft 251. The construction of the cam grooves 278 is such that the shaft 253 and arms 265 are rocked clockwise, as viewed in Figs. 3ᴬ, 3ᴮ, 4ᴬ, 4ᴮ, 6ᴬ and 6ᴮ, immediately after the totalizer wheels have been rotated to normal zero position and before the bell crank levers 148 begin their return movement to normal position. The bars 267, up on such movement of the arms 265, engage the right sides of the recesses 268 in the corresponding transfer bars 217, 246 and 247, and swing the latter toward the right to move their notches 264 into engagement with the points of the heart shaped cams 221 and thereby lock the totalizer wheels in zero position during the return movement of the bell crank levers 148 to normal position. Near the end of the rotation of the shaft 251 and after the alining noses on the bell crank levers 148 have been returned into engagement with the pinions 104 rigid with the totalizer wheels, the arms 265 are returned to normal position to permit the transfer bars to assume their normal position.

Printing mechanism.

It would, of course, be possible to read the accumulations entered on the various totalizers but as this would provide many chances for mistakes and would also be tedious, the machine is provided with printing means which need simply be moved once across the machine to print on a sheet of paper the accumulations on all of the totalizers.

The printing mechanism includes a printing drum 280 (Figs. 6ᴬ and 7) fast on a shaft 281 journaled in the vertical end plates 279 of a sliding frame 282. The end plates 279 of the frame 282 carry pairs of rollers 283 engaging in guideways or grooves 284 (Figs. 3ᴬ, 6ᴬ, 6ᴮ and 7) formed in the front and rear frames 56 and 91 of the machine. Rigidly mounted on the forward end of the shaft 281 is a gear 285 meshing with a rack bar 286 (Figs. 1ᴬ and 2ᴬ, 3ᴬ and 3ᴮ, and 7) rigidly mounted on the front frame 56 of the machine. When it is desired to take printing impressions from the totalizers the gear wheel 285 is rotated clockwise by means of a knob or handle 287, (Fig. 1ᴬ) whereby the gear 285 rolls over the rack bar 286 to rotate the printing drum 280, and at the same time slide the drum and the sliding frame 282 toward the right. As the drum is slid toward the right in this manner, the type at the printing line of the totalizer wheels prints on a sheet of paper (Fig. 26) placed about the periphery of the printing drum. The periphery of the printing drum is of rubber or other suitable material so that proper printing impressions are made on the paper from the totalizers.

As the totalizer frames are held in normal position by the levers 111 pivoted on the totalizer frames and coöperating with the armatures 116, there might be some play between the parts and therefore, when the printing drum rolls over the totalizers, the drum might slightly depress the totalizers and clear printing impressions would not be taken from the totalizers if the following means were not provided. To hold the totalizers rigidly in their normal position to print on the paper as the printing drum is rolled over the totalizers a cross bar 289 of the frame 282 (Figs. 3ᴬ, 6ᴬ and 7) has five pairs of cam ridges 290 on its lower face, there being one pair of cam ridges for each row of totalizers. The cam ridges engage rollers 291 mounted on the levers 107 and 108 comprising the totalizer frames, so that when the printing drum contacts with the totalizers the latter are prevented from being depressed.

As the sliding frame 282 is slid toward the right, inking rollers 293, (Figs. 3ᴬ, 6ᴬ and 7) mounted on a cross rod 294 extending through the cross bar 289 of the sliding frame ink the printing lines of the totalizer wheels before the paper on the drum contacts therewith. As shown in Fig. 7 there is one ink roll for each row of totalizers.

In order to prevent any contact between the totalizers and the inking rolls and the printing drum when the sliding frame 282 is slid toward the left to normal position after the totalizers have been printed from, the sliding frame 282 is rocked to elevate the printing drum and the inking rollers upon initial movement of the sliding frame in such direction. To this end the grooves 284, near their right hand ends (Figs. 1ᴮ, 3ᴮ and 6ᴮ) are provided with members or gates 295 pivoted at 296 and above the gates are openings 297 in the grooves 284. As the sliding frame 282 approaches the end of its sliding movement toward the right the right hand rollers 283 engage and lift the gates 295 and as soon as the rollers pass from under the gates the latter fall back to normal position. Then when the movement of the sliding frame to the left is begun these right hand rollers ride up on the gates 295 through the openings 297 and ride on top of the frames 56 and 91. It can be seen that as the right hand rollers ride up these gates 295 the frame 282 is rocked counter clockwise about the left hand rollers 283 as pivots, whereby the printing drum and the inking rollers are raised so that they will not coöperate with the totalizers during movement of the sliding frame toward the left. The gear 285 (Figs. 1ᴬ and 3ᴬ) is elevated out of mesh with the rack 286 when the frame 282 is rocked about the left hand rollers 283 so that it is not necessary to rotate the drum upon return movement of the sliding frame toward the left. When the sliding frame has been slid as far as possible toward the left the right hand rollers pass through openings 290 in the grooves 284, the sliding frame thereupon rocking to normal position.

The horizontal alining arms of the bell crank levers 148 for the tens totalizer wheels carry projections 299 (Figs. 8 and 9) provided with decimal points 300 (Fig. 9) to print the decimal points of the printed totals at the proper places.

Fig. 26 shows an illustrative form of record printed from the totalizers. It will be observed from this view that the totals of a vertical column printed from a row of totalizers are equi-distant apart whereas the distance between the seventh and eighth totalizers of each row is considerably greater than that between the other totalizers of the row. In order to avoid a gap or a greater distance between the seventh and eighth printed totals in the columns, (counting from the top) than exists between the other printed totals of the columns, the sheet of paper may be arranged on the printing drum 280 so that the first totalizer, counting from the left, of each row will print the seventh record from the top in the corresponding column of totals on the printed sheet of paper. Then the seventh totalizer will print the first total in the column on the sheet, the eighth totalizer (the first to the right of the drive shaft 96) will print the last total in the column and the last totalizer will print the eighth total in the column. This can be done by placing the paper about the printing drum so that the gap between the ends of the paper is at the top of the drum when the drum is in position to print the seventh total in a column from the first totalizer in the corresponding row. Then as the drum is moved toward the right the totalizers to the left of the drive shaft 96 prints on the upper half of the paper sheet. As the printing drum passes over the gap between the seventh and eighth totalizers of a row the gap between the ends of the paper is at the bottom of the drum so that the eighth totalizer will print the last total in the column and the last totalizer will print the eighth total in the column.

*Record strip.*

The perforated record strip 122 adapted to control the selection of the totalizers for operation and to control the extent of movement of the actuating racks 112 is shown in Figs. 1ᴬ and 2ᴬ, and a portion of the strip is shown in Fig. 25. The dots in Fig. 25 represent the index positions at which the strip may be perforated by the perforating machine described in the above mentioned co-pending application filed by Maximilian M. Goldberg. The perforations 303 in the horizontal rows having twenty index positions represent the amounts. The perforations 304 in the next rows of index positions below the amount rows of perforations (Fig. 25) represent the clerks making the various transactions. The perforations in the index positions in the next rows below the perforations representing the clerks, represent the departments, the cashiers under which the clerks operate, and the kinds of transactions. The department in one of these last rows is represented by a perforation 305 through one of the first six index positions counting from the left (Fig. 25), the cashier by a perforation 306 through the eighth, ninth, or tenth index positions and the class to which a transaction belongs by a perforation 307 through the eleventh, twelfth, or thirteenth index positions.

The seventh index position (counting from the left) in the first row of index positions (the bottom row in Fig. 25) on the record strip is perforated by the perforating machine of the above mentioned co-pending application during the last operation of the machine before the strip is removed therefrom, it being understood that this perforation in the first row of index positions to come into position to control the selection of the number totalizer of the present invention is the last perforation made by the perforating machine, as the record strip when attached to the machine of the present invention is unwound from the roll upon which the strip is wound in the perforating machine. This perforation through the seventh index position in the first row of perforations is designated by the reference numeral 308 in Figs. 2ᴮ and 25, and controls the energization of the electro-magnet 117 for the number totalizer or accounting device (Fig. 6) this totalizer being adapted to print the number of the perforating machine from which the record strip was taken at the top of the right hand column on the printed sheet, as shown in Fig. 26. At the same time that this perforation 308 is made in the record strip the appropriate row of the amount index positions is perforated to represent the number of the perforating machine, these perforations representing the number being adapted to control the extent of movement of the actuating racks 112 so that this number is entered in the number totalizer.

Three rows of punches for perforating the record strip, as each transaction is entered in the perforating machine of the co-pending application, is provided in this perforating machine. The means for feeding the record strip in the perforating machine is constructed to feed the strip forward three-fourths the distance between two adjacent rows of punches upon each operation of the machine. It can be seen, therefore, that there are three rows of index positions between the first and second and the second and third rows of index positions perforated to represent the data of one complete sale. The brackets connecting the dash lines in Fig. 25 indicate the rows of perforations representing the various sales, there being one bracket for each sale. In Fig. 2ᴮ these appropriate rows of perforations for three of the sales are designated by dotted lines 310 forming rectangles. The left hand side lines of these rectangles pass through the perforations 303 representing the amounts, the central lines pass through the perforations 304 representing the clerks making the transactions and the right hand side lines pass through the perforations 305, 306 and 307 representing respectively the departments, the cashiers and the classes of transactions. The right hand side line of a dotted rectangle 311 in this Fig. 2ᴮ passes through the perforation 308 for selecting the number totalizer for operation and the left hand side line of this rectangle passes through the porforations representing the number of the perforating machine, from which the record strip is taken.

In the rows of amount index positions five index positions represent one denomination and as there are four differentially movable shafts 161, there are twenty index positions in each row of amount index positions. Each digit of one denomination is represented by two perforations through two of the five index positions representing the particular denomination. The amount index positions between two adjacent vertical broken lines in Fig. 25 represent one denomination.

*Feeding mechanism for record strip.*

It is to be understood that there is one of these record strips used in each cashier-inspector's station of the establishment and at the end of the day's business the record strips of the various stations are taken to the auditing department and run through the auditing machine of the present invention. After a record is perforated in the record strip by the perforating machines at one of the cashier-inspector's stations, it is unwound from one roll and wound on another. These storage rolls for the perforated record strip may be conveniently transferred to the auditing machine of the present invention.

As shown in Fig. 1ᴮ, the record strip 122 passes from a supply roll 313, upon which the strip was wound in the perforating machine of the above mentioned co-pending application, over a guide roller 314 across a table 315, over a guide roller 316, onto the storage roll 317 which serves as the supply roll in the perforating machine. The supply and storage rolls are cylindrical in form as best shown in Fig. 14 and have vertical flanges 318 on their forward ends. The storage roll 317, when attached to the machine is slid over a cylindrical member 319, serving as a counter-part for the storage roll 317 and the storage roll is mounted on the member 319 in any desired manner to rotate therewith. The cylindrical member 319 is loosely mounted on a shaft 320, journaled at its rear end in the frame 56 of the machine. A sleeve 321 is loosely mounted on the shaft 320 and has screw threads coöperating with internal threads in the member 319. The supply roll 313 is mounted on a cylindrical counter-part 322 (Fig. 1ᴮ) which is loosely mounted on a rod 323 projecting from the frame 56 of the machine. The table 315 is loosely mounted on a shaft 324, which is journaled at its forward end in an upright frame 325 and at its rear end in the frame 56. In order to hold the table stationary a stud 327 (Figs. 1ᴮ and 2ᴮ) rigidly connects the table to the frame 56.

Pins 328 (Figs. 1ᴮ and 2ᴮ) on the periphery of two disks 329 coöperate with holes 330 made in the record strip by the perforating machine of the above mentioned co-pending application, when the records are perforated thereby. The disks 329 are rigidly mounted on the shaft 324 upon which is also rigidly mounted a ratchet 331 and a pulley 332. Coöperating with the ratchet 331 is a pawl 333 loosely mounted on a pin 334 carried by an arm 335 loosely mounted on the shaft 324. A leaf spring 336 is mounted on a link 338 and engages the pawl 333 to retain the latter in engagement with the ratchet 331. The arm 335 is pivotally connected by the pin 334 to the right hand end of the link 338 which at its left hand end is pivotally connected to an arm 340 fast on a shaft 3331 mounted in portions 341 of the frame 104. Fast on the shaft 3331 is an arm 3401 (Fig. 2ᴮ) carrying a roller (not shown) which projects into a cam groove 342 formed in the periphery of a cam disk 343 rigidly mounted on the shaft 175. The configuration of the cam groove 342 is such that during the second half of a cycle of operation of the machine the link 338 is moved toward the right so that the pawl 333 engages behind the next succeeding tooth of the ratchet 331 and when the link 338 is moved in the opposite direction to normal position the pawl rotates the ratchet 381 and, therefore, the disks 329 one step to feed the record strip from the supply roll 321. A belt 344 passes about the pulley 332 fast on the shaft 324, and about a pulley 345 fast on the shaft 320, the shaft 320 being rotated one step in this manner upon each step of movement of the feeding rolls 329.

The storage roll 317 is frictionally driven by the shaft 320 so that the amount of record strip feed on the storage roll is always the same as that invariably fed from the supply roll by the pins 328 on the disks 329. A spring 347 (Fig. 14) is coiled about the shaft 320 and is connected at one end to a disk 348 loosely mounted on the shaft and at its opposite end to a disk or collar 349 fast on the shaft. The spring is compressed between this collar 349 and the disk 348 to press the latter firmly against the member 319. When the shaft 320 is rotated by the belt 344 and pulleys 332 and 345, the disk 348, because of the compression of the spring 347, frictionally connects the storage roll to the shaft 320 so that the storage roll is rotated until the amount of record strip fed from the supply roll is wound on the storage roll, after which the shaft 320 rotates independently of the storage roll. It can be seen that as the size of the paper roll on the storage roll increases the extent of movement of the storage roll proportionally lessens.

In order to insure the coöperation of the pins 328 in the holes 330 in the record strip and to assist these pins in feeding the record strip, rollers 350 (Figs. 1$^B$ and 2$^B$) mounted on the right hand end of levers 351 coöperate beside the pins 328 with the peripheries of the disks 329. The levers 351 are loosely mounted on studs 352 projecting from the portions 341 (Fig. 2$^B$) of the frame 164 and springs 354 (Fig. 1$^B$) connected to the left hand ends of the levers 351, serve to press the rollers 350 against the disks 329. When the disks 329 are rotated the rolling action between the rollers 350 and these disks assist in feeding the record strip and thereby relieves the tension between the pins 328 and the paper to prevent the paper from being torn by the pins, the latter being provided more particularly so that the record strip will be fed an invariable distance upon each cycle of operation of the machine to bring each perforated record into exact position to control the machine.

*Contact pin box.*

Three rows of contact pins 356$^a$, 356$^c$, 356$^d$, 356$^n$, 356$^i$, 356$^t$ and 356$^s$ (Figs. 1$^B$, 2$^B$ and 12) corresponding to the three rows of index positions perforated in the record strip to represent the data of one complete sale are slidably mounted in a box 357, the top and bottom of which are formed of fiber or other insulating material to insulate the contact pins from each other. Two arms 358, rigidly mounted at their left hand ends on a shaft 359, journaled in the portions 341 of the frame 164, are pivotally connected at their right hand ends to the ends of the pin box 357. Links 360, parallel to the arms 358, are pivotally mounted at their left hand ends on studs projecting from the portions 341 of the frame 164, and at their right hand ends are pivotally connected to the ends of the pin box. Rigidly mounted on the shaft 359 is an arm 361 carrying a roller 362 at its lower end projecting into a cam groove 363 formed in the periphery of a disk 364 which is rigidly mounted on the shaft 175. The cam groove 363 is so shaped that the pin box remains in the normal position shown in Figs. 1$^B$ and 12 until after the actuating racks have been differentially positioned and the selected totalizers moved into mesh with the actuating racks and then the cam groove 363 rocks the arms 361 and 358 counter clockwise to raise the pin box before the actuating racks begin their return movement to normal position. While the pin box is in elevated position the record strip is fed as above described, and then finally, near the end of each cycle of operation, the pin box is lowered to its normal position. When the pin box is lowered to normal position, the contact pins contact with the record strip if the index positions corresponding to the pins have not been perforated and the pins whose corresponding index positions have been perforated pass through the perforations. When the amount contact pins 356$^a$ pass through perforations they contact with contact blocks 366 (Figs. 12 and 28) mounted in the top of the table 315, there being one of these blocks for the five pins of each denomination. The transaction pins 356$^t$, when they pass through corresponding perforations, contact with a contact block 367, mounted in the top of the table 315, which is made of fiber or other suitable insulating material. All the other contact pins except contact pin 356$^s$, upon passing through the corresponding perforations in the record strip contact with a contact plate 368, also mounted in the table. As shown in Fig. 12 springs are coiled about the contact pins and are compressed between the top of the pin box and collars 369 on the pins to yieldingly hold the pins in engagement with the record strip or in contact with the blocks 366, 367 and plate 368 when the pin box is in normal lowered position.

In order to permit the record strip to be inserted between the table 315 and the contact pin when the strip is attached to the machine the cam groove 363 has a recess 3621 normally adjacent the roller 363 so that the operator can raise the pin box manually, the roller thereupon being moved into the recess 3621.

*Commutators.*

The actuating mechanism has been described and now the means for completing circuits through the electromagnets 194 (Figs. 3A and 7) and the amount contact pins 356a, coöperating with the contact blocks 366 when the appropriate actuating shafts 161 have been rotated to move the actuating racks 112 extents corresponding to the amount represented by the amount perforations will be described.

The energization of the electro-magnets 194 is effected by the closing of circuits through commutators 370 (Figs. 1A, 2A, 10, 11 and 22) rigidly mounted on the shaft 53, there being one commutator for each shaft 161. The commutators are duplicates of each other and each commutator is a device for completing an electric circuit through the corresponding electro-magnet 194, whenever the appropriate shaft 161 has moved the actuating racks 112 a number of steps commensurate with the digit represented by the two amount perforations of the corresponding denomination in the record strip. Each commutator comprises five contact disks 371, shown in perspective in Figs. 16 to 20 inclusive. The disks 371 have projections 372 and holes 373 of different sizes, the projections and the holes being shaped so that when the disks are assembled, as best shown in Figs. 10, 11 and 22, the ends of the projections 372, projecting from the same sides of the disks 371 are in the same planes and extend beyond the end disks 371 distances equal to the width of one of the disks 371 and so that the outer curved surfaces of the portions of the projections projecting beyond the end disks form continuous arcs of circles. Two disks 375 for each commutator are cut away at 376 and are placed beside the end disks 371 of the commutator. The disks 375 are of non-conducting material or suitably insulated from the disks 371. The projections 372 on the disks 371 project into the cut away portions 376 of the disks 375. The disks 371 and 375 of each commutator, arranged as above described, are mounted on a sleeve 377 (Fig. 23) in any desired manner so that they are not rotatable relative to the sleeve. The disks of the commutator are insulated from the sleeve 377 and the latter is rigidly mounted on the shaft 53 in any desired manner. Each sleeve 377 has a circular flange 378 adapted to fit into a cut away portion 379 (Fig. 21) in one of the end disks 375 and a nut 380 (Fig. 22) is screwed on the opposite end of the sleeve 377, the flange 378 and the nut 380 being provided to prevent the disks 371 and 375 from moving longitudinally of the sleeve 377.

Brushes 382 (Figs. 2A and 10) contact with the corresponding disks 371 and 375. The brushes for the disks 371 are connected by wires 383 (Fig. 28) to the corresponding amount contact pins 356a of the denomination appropriate to the commutator. The brushes contacting with the disks 375 through electrical connections, to be described later, are connected to the corresponding electro-magnets 194 (Fig. 7). The brushes for the disks 375 of a commutator normally contact with these disks but near the beginning of the rotation of the shaft 53 and the commutator, (*i. e.* during the first unit of movement of corresponding shaft 161 and racks 153) the projection 372, projecting from the right hand face (Figs. 11 and 17) of the second disk 371 (counting from the left in Fig. 11) and one of the projections 372, projecting from the left hand side of the first disk (Figs. 11 and 16) simultaneously contact with the brushes for the disks 375. If the first and second index positions (counting from the right in Fig. 25) of the index positions representing the denomination corresponding to the commutator are perforated to represent "zero" an electrical circuit is completed through the two amount contact pins passing through these perforations, the contact block 366, the first and second disks 371, and the corresponding electro-magnet 194 and energizes the latter. When the electro-magnet is energized under the control of the two perforations representing "zero" the movement of the corresponding shaft 161 is arrested at the end of its first step of movement, it being remembered that the shafts 161 are moved an additional step for the purpose of moving the actuating racks 112 an additional step when transfers are required. This circuit will be traced more particularly with reference to Fig. 28 later. When a commutator has been moved two steps the brushes for the left and right hand disks 375 respectively (Fig. 11) are in engagement with projections 372 on the first and third disks (counting from the left in Fig. 11) so that if the corresponding index positions of the appropriate series of index positions are perforated to represent "one," the corresponding electro-magnet 194 is energized to arrest the movement of the corresponding shaft 161 at the end of the second step of movement of the latter. In like manner, by observing lines 3720 in Fig. 11, it will be seen that when a commutator has been moved two, three, four, five, six, seven, eight, and nine steps respectively the brushes for the disks 375 are in engagement with projections 372 on the second and third disks, the second and fourth disks, the third and fourth disks, the third and fifth disks, the second and fifth disks, the fourth and fifth disks, the first and fifth disks, and the first and fourth disks and therefore perforations through the index positions corresponding to these disks represent respectively the digits "2," "3," "4," "5," "6," "7," "8," and "9." By the completion of a circuit in this manner through two of the disks 371 and the corresponding contact pins the appropriate electro-magnet 194 is energized whenever the commutator has moved one more step than the number of steps corresponding to the digit represented by two perforations through two of the index positions of the corresponding denomination. When an electro-magnet 194 is energized the clutch disk 181 is slid rearwardly on the shaft 161 to disconnect the shaft 161 from the driving mechanism as above described. The currents through the electro-magnet 194 are only momentarily established as the brushes for the disks 375 of a commutator only contact momentarily with two of the projections 372 on the disks 371 at the same time.

*Electrical circuits through magnets 194.*

Having described the main mechanical features of the actuating mechanism, the electrical circuits including the commutators, the amount contact pins 356ª and the electro-magnets 194 will now be described with particular reference to the diagrammatic view shown in Fig. 28.

As above stated, whenever a commutator is rotated one unit more than the number represented by the two amount perforations in the record strip, the brushes for the disks 375 of the commutator engage the projections 372 on the disks 371 corresponding to the perforated index positions and complete a circuit through the appropriate electromagnet 194 and this circuit is as follows: From the battery 85, through wire 86, contacts 81 and 82, wires 87, 387, 388, and 389, brush 382 for the right hand disk (Fig. 28) of the commutator through projection 372, disk 371, corresponding wire 383, corresponding amount contact pin 356ª, contact block 366, the other contact pin 356ª in contact with the contact block 366, wire 383 connected to the last mentioned contact pin, the corresponding disk 371 and projection 372 on the latter, brush 382 for the left hand disk 375 of the commutator, wire 392, electro-magnet 194, wires 393 and 394, back to the battery.

*Totalizer switch.*

It is only necessary to close the circuits through the electro-magnets 117, normally retaining the totalizers out of engagement with the actuating racks 112, for a time sufficient to permit the armatures of the energized electro-magnets to be drawn downward by the magnets and it is essential that these circuits be closed after the actuating racks are in their differentially moved positions and before they begin their return movement to normal position. Furthermore, it is evident that the electro-magnets 117 should be deënergized to permit their armatures to engage with the levers 111 when these levers are restored to normal position so that the totalizers will be held out of engagement with the actuating racks when the restoring bars 130 are moved to normal position. To close these circuits at the proper time a totalizer switch shown in Figs. 1ᴬ and 2ᴬ is provided. This totalizer switch comprises two spring contacts 396, which are forced into engagement by a cam disk 397, fast on the shaft 53, after the actuating racks have been differentially positioned and before they begin their return movement to normal position, to close circuits through the electromagnets 117.

*Clerks' grand totalizer circuits.*

The circuit through the electro-magnet 117 for the grand totalizer assigned to the clerk represented by the clerk's perforation in the record strip is completed when the totalizer switch is closed by the cam disk 397. The circuits through the electro-magnets for the clerks' grand totalizers are similar and for convenience the circuit through the electro-magnet for the totalizer assigned to clerk " G " will be traced and is as follows: from the battery 85, wire 86, contacts 81 and 82, wires 87, 387, 388, 400, contacts 396 of the totalizer switch, wires 401, 402, 403, and 404, electro-magnet 117 for the grand totalizer assigned to clerk "G", wires 405, 406, 407 and 408, clerk "G's" contact pin 356ᶜ, contact plate 368, wires 409 and 394, back to the battery.

*Selection of clerks' transaction totalizers and of grand transaction totalizers.*

As already stated, there is one totalizer for each clerk in each row of clerks' transaction totalizers. The transaction perforation 307 in the record strip controls means for electrically connecting together one of the terminals of each electro-magnet for the totalizers of the corresponding row of clerks' transaction totalizers and this means also constitutes part of the circuits including the electro-magnets of the grand transaction totalizers. The clerk's perforation 304 controls the completion of an electric circuit through the electro-magnet for the corresponding clerk's transaction totalizer in the row of totalizers corresponding to the class of transactions represented by the transaction perforation.

The means under the control of the transaction perforation for connecting together the electro-magnets for the corresponding row of clerks' transaction totalizers will now be described. Journaled at their ends in the frames 54 and 72 (Figs. 1ᴀ and 2ᴀ) but suitably insulated therefrom are three parallel shafts 412 (Figs. 1ᴀ, 2ᴀ and 15). Embedded in each shaft 412 and parallel with the axis thereof is a strip 413 of insulating material upon which the free ends of a plurality of spring contacts 414 normally rest. The contacts 414 are mounted on, but insulated from cross rods 415 supported at their ends in the frames 54 and 72. In each row of spring contacts 414 there is one contact for each electro-magnet 117 in the corresponding row of clerks' transaction totalizers, each of these contacts being connected to a wire 416 comprising one terminal of the corresponding electro-magnet 117. There are also two additional contacts 410 and 411 in each row of contacts, the contact 410 being connected by wiring to be described presently, to the corresponding transaction contact pin 356ᵗ, while the other contact 411 is connected to the electro-magnet for the corresponding grand transaction totalizer. An arm 417 is fast on each shaft 412 and a spring 418, connected to its corresponding arm 417 tends to rock the arm 417 and its shaft 412 counter-clockwise, as viewed in Fig. 15. Such rocking movement of the arm 417 and shaft 412 is normally prevented by the engagement of a nose on the lower end of an armature 419 for a corresponding electro-magnet 420. When the totalizer switch comprising the spring contacts 396 (Fig. 1ᴀ) is closed a circuit is completed through the transaction contact pin 356ᵗ in contact with the block 367 and through the corresponding electro-magnet 420, whereupon the energized electro-magnet 420 attracts its armature 419 against the action of its spring 421 to withdraw the nose of the armature from under the arm 417 and thereby permit the spring 418 to rock the arm 417 and the shaft 412. In this manner the insulating strip 413 embedded in the shaft is moved out of engagement with the spring contacts 410, 411 and 414, so that the latter contact with the shaft 412 which is of conducting material.

When the totalizer switch is closed, the circuit (Fig. 28) through the electro-magnet corresponding to the transaction perforations is as follows: from the battery 85, through wire 86, spring contacts 81 and 82, wires 87, 387, 388 and 400, totalizer switch, wires 401, 425, contact block 367, the transaction contact pin 356ᵗ in contact with the contact block 367, wires 426 and 427, electro-magnet 420, wires 428, 429, 430 and 394, back to the battery.

In order to restore the operated shaft 412 (Figs. 1ᴀ, 2ᴀ and 15) to normal position after the corresponding electro-magnet 420 has been energized and the totalizer switch has been broken the following device is employed: Each shaft carries a rearwardly extending arm 431 projecting under a corresponding pin 432 projecting from a vertical link 433 which is pivotally mounted on the forward ends of horizontal arms 434. The links 434 are pivotally mounted at their rear ends to the frame 54 and a spring 435 tends to retain the arms 434 and the link 433 in the position shown in Fig. 15. A cam 436, rigidly mounted on the shaft 53, engages the upper arm 434 and is so constructed as to swing the arms 434 and thereby lower the link 433 after the totalizer switch has been broken. Upon such movement of the link 433, one of the pins 432 engages the arm 431 on the operated shaft 412 to rock the latter to normal position and the spring 421 for the armature 419 moves the latter so that its nose engages under the arm 417 to retain the shaft 412 in normal position until the corresponding electro-magnet is again energized.

When a transaction contact pin 356ᵗ is in engagement with the contact plate 367 and the totalizer switch is closed, a circuit is completed through the contact pin, the corresponding shaft 412 and the electro-magnet 117 for the corresponding grand transaction totalizer. To illustrate, the circuit through the electro-magnet for the grand charge totalizer is as follows: from the battery 85, through wire 86, contacts 81 and 82, wires 87, 387, 388, and 400, totalizer switch, wires 401, 425, contact block 367, the charge contact pin 356ᵗ, wires 426 and 451, spring contact 410, shaft 412, spring contact 411, wires 452, electro-magnet for the grand charge totalizer, wires 454, 456, 473, 430, and 394, back to the battery.

For the sake of convenience the electrical circuit through the electro-magnet for retaining clerk "G's" charge totalizer out of normal engagement with the actuating racks will be traced, this circuit being illustrative of the circuits for the other clerks' transaction totalizers. This circuit for selecting clerk "G's" charge totalizer is as follows: from the battery 85, wire 86, contacts 81 and 82, wires 87, 387, 388 and 400, totalizer switch, wires 401, and 425, contact block 367, charge contact pin 356ᵗ, wires 426, 451, contact 410, shaft 412, contact 414, wire 416, electro-magnet for "G's" charge totalizer, wires 407, 408, clerk "G's" contact pin 356ᶜ, contact plate 368, wires 409, and 394, back to the battery.

*Cashier's totalizer circuit.*

The circuit through one of the electro-magnets for a cashier's totalizer is as follows:—from the battery 85, wire 86, contacts 81 and 82, wires 87, 387, 388, and 400, totalizer switch, wires 401, 402, 457, 440, 441, 442, 443, 444, 460, 445 and 438, electro-magnet for the desired cashier's totalizer, wire 439, cashier's contact pin 356$^i$, contact plate 368, wires 409, and 394, back to the battery.

*Departmental totalizer circuit.*

As an example of the circuits through the electro-magnets for departmental totalizers the circuit through the electro-magnet for the totalizer assigned to department VI will be traced, and is as follows: from the battery 85, through wire 86, contacts 81 and 82, wires 87, 387, 388, 400, totalizer switch, wires 401, 402, 457, 458, the electro-magnet for the "department VI" totalizer, wire 459, "department VI" contact pin 356$^d$, contact plate 368, wires 409, and 394, back to the battery.

*Circuit through magnet for number totalizer.*

As above stated the number totalizer is selected for operation by the perforation 308 (Fig. 25) through the seventh index position of the first row of index positions in the record strip and the actuating racks are controlled when this totalizer is selected for operation by the perforations representing the number of the perforating machine from which the record strip is taken. The circuit through this totalizer or accounting device is as follows: from the battery 85, through wire 86, contacts 81 and 82, wires 87, 387, 388 and 400, totalizer switch, wires 401, 402, 457, 440, 441, 442, 443, 444, 460 and 461, the electro-magnet for the number totalizer, wire 462, number contact pin 356$^n$, plate 368, wires 409 and 394, back to the battery.

*Circuit through electro-magnet 92.*

When the record strip is attached to the perforating machine described in the above mentioned co-pending application of Maximilian M. Goldberg, a perforation 465 (Fig. 25) is made by a punch. The first perforated record, representing a sale, made in the record strip by the perforating machine is the last record brought into register with the contact pins of the machine of the present invention and when this record is moved out of register with the contact pins during the last operation of the machine the perforation 465 is brought into register with the contact pin 356$^s$ (Figs. 2$^B$ and 28). When the pin box is lowered during the last cycle of operation of the machine of the present invention the contact pin 356$^s$ passes through the perforation 465 and contacts with a contact plate 467 mounted in the table 315 and thereby completes a circuit through the electro-magnet 92. This circuit is as follows: from the battery 85, through wire 86, contacts 81 and 82, wires 87, 387 and 470, electro-magnet 92, wire 471, contact pin 356$^s$, contact block 467, wires 472, 473, 430, and 394, back to the battery.

When the electro-magnet 92 is energized in this manner, it attracts the lower end of the lever 73 (Fig. 24) thereby rocking the latter and the shaft 71 counter clockwise, as viewed in this figure to withdraw the upper end of the lever out of engagement with the notch 76 in the forward end of the arm 74 whereupon the spring 68 rocks the motor locking arm 63 to normal position to stop the motor as above described.

It can be seen, therefore, that after the auditor has started the operation of the machine, it is not necessary for him to give it further attention as the strip is not only automatically fed through the machine until the last item entered on the strip is registered in the machine but it is also automatically stopped under the control of the perforation 465 in the record strip when the latter has been completely run through the machine.

*Operation.*

Having described in detail the various mechanical parts and the electrical circuits of the machine a résumé of the operation of the machine may be given here.

After the perforated record strip has been attached to the machine so that the first holes 330 (Fig. 2$^B$) at the sides of the record strip are over the pins 328 at the top of the disks 329 in which position of the strip the perforation 308 representing the number totalizer is in register with the corresponding contact pin 356$^n$, the shaft 64 and motor locking arm 63 are rocked by the handle 69 on the shaft 64 to release the machine, the motor clutch being connected and the motor circuit closed when the locking arm is rocked in this manner.

Upon the first cycle of operation of the machine the number totalizer or device is selected for operation and the amount perforations representing the number of the perforating machine from which the record strip was taken controls the extent of movement of the actuators. Upon each succeeding cycle of operation of the machine, that is, upon each succeeding rotation of the main drive shaft 96 the perforations representing one sale control the selection of the desired totalizers and the extent of movement of the actuators.

The cam groove 363 (Fig. 1$^B$) is so formed that during approximately the first half of each cycle of operation of the machine the pin box is in normal position and the contact pins in register with the perforations in the record strip project through the same and contact with the contact blocks in the table 315. When the totalizer switch comprising the contacts 396 is closed, the circuits including the contact pins, passing through the perforations representing the totalizers and the electro-magnets 117 for the corresponding totalizers, are closed to energize these electro-magnets. When an electro-magnet 117 is energized, it attracts its armature 116, whereupon the lever 111 for retaining the totalizer out of engagement with the actuating racks 112, is rocked so that its notch or recess 127 engages the corresponding pin 128 on the bar 130. The bar 130 is immediately moved toward the right by the corresponding pair of cams 143 and 145 thereby positively moving the totalizer into engagement with the actuating racks.

The totalizers are not rocked into engagement with the actuating racks 112 until after the latter have been moved to different positions corresponding to the amounts represented by the amount perforations 303 in the record strip, the totalizer switch being closed at this time. The cam grooves 173 (Figs. 1$^A$ and 2$^A$) rock the segment gears 170 and the corresponding clutch members 169 (Figs. 1$^A$, 2$^A$ and 7) an invariable movement in one direction and then move them in the opposite direction to normal position. As the clutch disks 169 and 181 are retained in engagement by the engagement of the armatures 193 of the corresponding electro-magnet 194 under the arms 191 of the yoke members 188, the clutch disks 181 and the shafts 161 upon which the clutch disks 181 are splined are rotated with the clutch disks 169 until the electro-magnets 194 are energized. When the electro-magnets 194 are energized the springs 196 are permitted to rock the yoke members 188 to slide the clutch disks 181 rearwardly on the shafts 161 and move the locking disks 183, rigid with the clutch disks 181, into locking engagement with the disks 199 fast on the frame 164. Each electro-magnet 194 is energized when the corresponding commutator is moved an extent past zero position corresponding to the digit represented by the perforations through two of the five index positions of the corresponding denomination, at which time a circuit, as above described, is completed including the two contact pins coöperating with the amount perforations, the corresponding disks 371 of the commutator and the electro-magnet 194. The differential movement of the actuating shafts 161 from normal position is imparted to the racks 153 by the pinions 160 fast on the shaft 161 and as the racks 153 are connected to the actuating racks 112 by the transfer levers 154 the actuating racks are moved extents commensurate with the amount perforations in the record strip. After the actuating racks are differentially positioned and before they begin their return movement to normal position, the totalizer switch is closed whereupon the selected totalizers are rocked into engagement with the actuating racks, as above described. Upon return movement of the clutch disks 169 to normal position they engage the clutch disks 181 and draw the latter forwardly on the shafts 161 into normal relation with the disks 169 so that the latter automatically restore the clutch disks 181, the shafts 161, the racks 153 and the actuating racks to normal position.

The totalizer switch is broken during the return movement of the actuating mechanism to normal position and after the totalizer switch has been opened the pin box is elevated to permit the record strip to be fed. After the actuating racks are restored to normal position the restoring bars 130 are moved toward the left past normal position so that their pins 147 engage the levers 111 for the engaged totalizers thereby lifting the latter to normal position. As the electro-magnets 117 are deënergized during the return movement of the actuating racks their armatures 116 are moved to normal position by the springs 120 whereby they retain the totalizers out of engagement with the actuating racks until the electro-magnets are again energized.

During the last cycle of operation of the machine the contact pin 356$^s$ passes through the perforation 465 (Fig. 25) thereby completing the circuit through the electro-magnet 92 (Figs. 1$^A$, 2$^A$ and 27) whereupon the latter rocks the lever 73 to permit the motor locking arm 63 to be rocked back to normal locking position to stop the machine.

After one or more strips have been run through the machine the sliding frame 282 carrying the printing drum 280 (Figs. 6$^A$ and 7) is slid across the machine by the rotation of the gear wheel 285 (Figs. 1$^A$ and 3) over the stationary rack 286. As the sliding frame moves across the machine the inking rollers 239, carried in the frame, ink the printing lines of the totalizers and then the sheet of paper (Fig. 26) wrapped about the drum is pressed against the printing lines of the totalizers as the drum rolls over the latter. After the drum has been moved completely toward the right over the totalizers and when its return movement to the left is begun the right hand rollers 283 on the sliding frame ride up on the gates 295 in the grooves 284 so that the printing drum, and the inking rollers 290 are out of coöperative relation with the totalizers during the return movement of the sliding frame toward the left.

After a record is printed from the totalizers the shaft 251 (Figs. 3$^A$ and 5$^A$) is given one complete rotation by the crank handle 250 (Figs 2$^A$ and 3$^A$) to reset the totalizers to zero. Upon such rotation of the shaft 251 the cam disks 252, fast on the shaft, rock the levers 254 to move the resetting bars 259 toward the left. When the resetting bars are moved in this manner they rotate the shafts 149 through the meshing of the sets of teeth 260 with the segments 261 fast on the shafts. As the bell crank levers 148 are fast on the shafts 149 they are rocked with the shafts and the downwardly extending arms coöperate with the heart shaped cams 221 to turn the totalizer wheels to zero position.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with a plurality of totalizers, of a set of differentially movable actuators common thereto, a record, and electrically operated means normally retaining the totalizers out of engagement with the actuators and operated under the control of the record for selectively permitting movement of the selected totalizer into engagement with the actuators.

2. In a machine of the class described, the combination with a plurality of totalizers, of a set of differentially movable actuators common thereto, electro-magnets, one for each totalizer, normally retaining the totalizers out of engagement with the actuators, and record controlled means for selectively energizing said electro-magnets to permit engagement of the desired totalizer with the actuators.

3. In a machine of the class described, the combination with a plurality of rows of totalizers, there being one row for each class of transactions, of a record strip having perforations therein representing the various totalizers in a row, the different classes of transactions and the amount of each transaction, electrically operated means controlled by a perforation representing the class of transaction for determining the row of totalizers including the totalizer to be actuated, and electrically operated means controlled by the perforations representing the totalizers for determining the particular totalizer which is to be operated in the selected row of totalizers.

4. In a machine of the class described, the combination with a plurality of rows of totalizers, there being one row for each class of transactions and one totalizer for each clerk in each row of totalizers, of a record strip having perforations therein representing the various clerks, the different classes of transactions and the amount of each transaction, and electrically operated means controlled by the perforations representing the class of transactions and the clerk for selecting the desired clerk's totalizer in the desired row for operation.

5. In a machine of the class described, the combination with a plurality of rows of totalizers, there being one row for each class of transactions and one totalizer for each clerk in each row of totalizers, of a grand totalizer for each class of transactions, a record strip having perforations therein representing the various clerks, the different classes of transactions and the amount of each transaction, electrically operated means controlled by the perforation representing the class of transactions for determining the grand totalizer to be actuated and for determining the row of totalizers including the clerk's totalizer which is to be actuated, and electrically operated means controlled by the perforation representing the clerk for determining the particular totalizer which is to be operated in the selected row of totalizers.

6. In a machine of the class described, the combination with a plurality of rows of totalizers there being one row for each class of transactions and one totalizer for each clerk in each row of totalizers, of a grand totalizer for each class of transactions, a record strip having perforations therein representing the various clerks, the different classes of transactions and the amount of each transaction, and electrically operated means controlled by the perforations representing the class of transactions and the clerk for selecting the desired clerk's totalizer in the desired row for operation, and electrically operated means controlled by the perforation representing the class of transactions for determining the grand totalizer to be operated.

7. In a machine of the class described, the combination with a plurality of rows of totalizers there being one row for each class of transactions and one totalizer for each clerk in each row, of a grand totalizer for each clerk, a grand totalizer for each transaction, a record strip having perforations representing the different classes of transactions, the various clerks, and the amount of each transaction, electrically operated means controlled by the perforations representing the clerks for selecting the clerks' grand totalizers for operation, electrically operated means controlled by the perforations representing the classes of transactions for selecting the grand transaction totalizers for operation, and electrically operated means controlled by the perforations representing the clerks and the classes of transactions for selecting the desired clerks' transaction totalizers for operation.

8. In a machine of the class described, the combination with a plurality of rows of totalizers, there being one row for each class of transactions and one totalizer for each clerk in each row, of a grand totalizer for each clerk, a grand totalizer for each transaction, a record strip having perforations representing the different classes of transactions, the various clerks, and the amount of each transaction, means controlled by the perforations representing the clerks for selecting the clerks' grand totalizers for operation, means controlled by the perforations representing the classes of transactions for selecting the grand transaction totalizers for operation, and means controlled by the perforations representing the clerks and the classes of transactions for selecting the desired clerks' transaction totalizers for operation.

9. In a machine of the class described, the combination with a plurality of rows of totalizers, there being one row for each class of transactions and one totalizer for each clerk in each row, of actuating means for the totalizers, electro-magnets, one for each totalizer, for normally retaining the totalizers out of engagement with the actuating means, a record strip having perforations representing the different classes of transactions, the various clerks, and the amount of each transaction, the electrical circuits selectively closed under the control of a perforation representing the class of transactions for determining the row of totalizers including the totalizers to be actuated, and electrical circuits including said electro-magnets and selectively controlled by the perforation representing a clerk for energizing the electro-magnet for the desired totalizer in the selected row of totalizers.

10. In a machine of the class described, the combination with a plurality of rows of totalizers, there being one row of totalizers for each class of transactions and one totalizer for each clerk in each row of totalizers, of actuating means for the totalizers, electro-magnets, one for each totalizer, for retaining the totalizers out of engagement with the actuating means, a record strip having perforations representing the different classes of transactions, the clerks, and the amount of each transaction, and electrical circuits including said electro-magnets and controlled by the perforations representing the classes of transactions and the clerks for selectively energizing said electro-magnets.

11. In a machine of the class described, the combination with a plurality of rows of totalizers, there being one row of totalizers for each class of transactions and one totalizer for each clerk in each row of totalizers, of actuating means for the totalizers, electro-magnets, one for each totalizer, for normally retaining the totalizers out of engagement with the actuating means, a record strip having perforations representing the classes of transactions, the clerks, and the amount of each transaction, means controlled by the perforations representing the classes of transactions for connecting the electro-magnets for a desired row of totalizers together, and electrical circuits including said connecting means and said electro-magnets and controlled by the perforations representing the clerks for selectively energizing said electro-magnets.

12. In a machine of the class described, the combination with a plurality of rows of totalizers, there being one row of totalizers for each class of transactions and one totalizer for each clerk in each row of totalizers, of a grand totalizer for each class of transactions, actuating means for the totalizers, electro-magnets, one for each totalizer for retaining the totalizers out of engagement with the actuating means, means controlled by a perforation representing the class of transactions for connecting together the magnets in a desired row of clerks' totalizers, electrical circuits including said connecting means and the electro-magnets for the grand totalizers for selectively energizing these electro-magnets, and electrical circuits including the electro-magnets for the clerks' totalizers and said connecting means for selectively energizing the electro-magnets for the clerks' totalizers under the control of the perforations representing the clerks.

13. In a machine of the class described, the combination with a plurality of rows of totalizers, there being one row of totalizers for each class of transactions and one totalizer for each clerk in each row of totalizers, of a grand totalizer for each class of transactions, a grand totalizer for each clerk, actuating means for the totalizers, electro-magnets, one for each totalizer, for retaining the totalizers out of engagement with the actuating means, means controlled by a perforation representing the class of transactions for connecting together the electro-magnets for a desired row of clerks' transaction totalizers, electrical circuits including said connecting means and the electro-magnets for the grand transaction totalizers for selectively energizing the electro-magnets for the grand transaction totalizer, and electrical circuits including the electro-magnets for the clerks' transaction totalizers and said connecting means for selectively energizing the electro-magnets for the clerks' transaction totalizers under the control of the perforations representing the clerks, and electric circuits including the electro-magnets for the clerks' grand totalizers for selectively energizing these last mentioned electro-magnets under the control of the perforations representing the clerks.

14. In a machine of the class described, the combination with a plurality of totalizers, of actuating means therefor, a record strip having perforations, and electrically operated means controlled by two perforations in the record strip to select any one of the totalizers for actuation.

15. In a machine of the class described, the combination with an accounting device, of a differentially movable actuator movable in one direction and then in the reverse direction to normal position, an electro-magnet, and record controlled means for energizing said electro-magnet but once upon every operation of the actuator to determine the extent of movement of the actuator from normal position.

16. In a machine of the class described, the combination with an accounting device, of a differentially movable actuator movable in one direction and then in the reverse direction to normal position, an electro-magnet, and record controlled means for momentarily energizing said electro-magnet but once upon each operation of the actuator to determine the extent of movement of the actuator from normal position.

17. In a machine of the class described, the combination with a totalizer, of a differentially movable actuator therefor, operating means normally connected to the actuator, an electro-magnet, and record controlled means for energizing said electro-magnet at different points in the movement of the operating means to effect the disconnection of the actuator from the operating means.

18. In a machine of the class described, the combination with a totalizer, of a differentially movable actuator therefor, operating means normally connected to the actuator, an electro-magnet, and record controlled means for momentarily energizing said electro-magnet at different points in the movement of the operating means to effect the disconnection of the actuator from the operating means.

19. In a machine of the class described, the combination with a totalizer, of a differentially movable actuator therefor, driving means for the actuator and connected to the actuator for variable periods, an electro-magnet, a record, electrical circuits including said electro-magnet, and a commutating device for completing said circuits to energize said electro-magnet under the control of the record and thereby determine the period of connection between the driving means and the actuator.

20. In a machine of the class described, the combination with a totalizer, of a plurality of differentially movable actuators therefor, a record having perforations representing amounts, there being a pair of perforations to represent each digit of an amount, and means controlled by each pair of perforations for controlling the extent of movement of the corresponding actuator.

21. In a machine of the class described, the combination with a totalizer, of a plurality of differentially movable actuators therefor, a record having perforations representing amounts there being a pair of perforations to represent each digit of an amount, and electrically operated means controlled by each pair of perforations for controlling the extent of movement of the corresponding actuator.

22. In a machine of the class described, the combination with a totalizer, of a differentially movable actuator therefor, driving means for the differentially movable actuator and normally connected thereto, a record having two perforations to represent a digit, and means controlled by the two perforations for effecting the disconnection of the actuator from the driving means.

23. In a machine of the class described, the combination with a totalizer, of a differentially movable actuator therefor, driving means for the actuator, means for connecting the driving means and the actuator, a record having two perforations to represent a digit, and means controlled by the two perforations for operating said connecting means so that the actuator is moved an extent commensurate with the digit represented by the two perforations.

24. In a machine of the class described, the combination with a totalizer, of a differentially movable actuator therefor, driving means for the differentially movable actuator and normally connected thereto, a record having two perforations to represent a digit, and an electro-magnet energized under the control of the two perforations for effecting the disconnection of the actuator from the driving means.

25. In a machine of the class described, the combination with an accounting element, of a differentially movable actuator therefor movable in one direction and then in the reverse direction to normal position, a perforated record, and an electro-magnet energized under the control of a plurality of perforations in the record to determine the extent of movement of the actuator from normal position upon each operation thereof.

26. In a machine of the class described, the combination with an accounting element, of a differentially movable actuator therefor, movable in one direction and then in the reverse direction to normal position, a perforated record, and means controlled by a plurality of perforations in the record for determining the extent of movement of the actuator from normal position upon each operation thereof.

27. In a machine of the class described, the combination with a perforated record strip having two of five positions perforated to represent a digit, of contact pins, one for each of said positions, a commutator comprising a member for each of said positions and connected to the corresponding contact pins, and electric circuits one of which is completed through the contact pins corresponding to the two perforations and the two corresponding members of the commutator when the latter has moved an extent commensurate with the digit represented by the two perforations.

28. In a machine of the class described, the combination with a perforated strip having a plurality of perforations representing a digit, of a movable commutator, stationary brushes coöperating with said commutator, and electrical circuits one of which is completed under the control of the plurality of perforations when the commutator has moved an extent commensurate with the digit represented by the plurality of perforations.

29. In a machine of the class described, the combination with a perforated strip having a plurality of perforations representing a digit, of a movable commutator, stationary brushes coöperating with said commutator, electrical circuits one of which is completed under the control of the plurality of perforations when the commutator has moved an extent commensurate with the digit represented by the plurality of perforations, an electro-magnet included in said circuits, and a differentially movable member controlled by said electro-magnet.

30. In a machine of the class described, the combination with a perforated strip having a plurality of perforations representing a digit, of a movable commutator, stationary brushes coöperating with said commutator, electrical circuits one of which is completed under the control of the plurality of perforations when the commutator has moved an extent commensurate with the digit represented by the plurality of perforations, a driving member, a differentially movable actuator driven by the driving member, and means normally connecting said driving member and said actuator and operated when the circuit is completed through the commutator to disconnect the driving member and the actuator.

31. In a machine of the class described, the combination with a differentially rotatable shaft, of an invariably rotatable driving member therefor, a clutch element slidably mounted on the shaft and connecting the shaft and the driving member, means normally retaining said clutch element in connecting position, means for disabling said retaining means at different points in the movement of the driving member to permit the clutch element to be slid on the shaft and thereby disconnect the shaft and the driving member, and means for locking the shaft against rotation when it is disconnected from the driving member.

32. In a machine of the class described, the combination with a differentially rotatable shaft, of an invariably rotatable driving member therefor, a clutch element slidably mounted on the shaft and connecting the shaft and the driving member, means normally retaining said clutch element in connecting position, and record controlled means for disabling said retaining means at different points in the movement of the driving member to permit the clutch element to be slid on the shaft and thereby disconnect the shaft and the driving member.

33. In a machine of the class described, the combination with a differentially rotatable shaft, of an invariably rotatable driving member therefor, a clutch element slidably mounted on the shaft and connecting the shaft and the driving member, electrically operated means normally retaining said clutch element in connecting position, and means for disabling said retaining means at different points in the movement of the driving member to permit the clutch element to be slid on the shaft and thereby disconnect the shaft and the driving member.

34. In a machine of the class described, the combination with a differentially rotatable shaft, of an invariably rotatable driving member therefor, a clutch element slidably mounted on the shaft and connecting the shaft and the driving member, an electro-magnet normally retaining said clutch element in connecting position, and record controlled means for energizing said electro-magnet at different points in the movement of the driving member to permit the clutch element to be slid out of connecting position.

35. In a machine of the class described, the combination with a differentially rotatable shaft, of an invariably rotatable driving member therefor, a clutch element slidably mounted on the shaft and connecting the shaft and the driving member, means normally retaining said clutch element in connecting position, record controlled means for disabling said retaining means at different points in the movement of the driving member to permit the clutch element to be slid on the shaft and thereby disconnect the shaft and the driving member, and means for locking said shaft against rotation when it is disconnected from the driving member.

36. In a machine of the class described, the combination with a differentially rotatable shaft, of an invariably rotatable driving member therefor, a clutch element slidably mounted on the shaft and connecting the shaft and the driving member, an electro-magnet normally retaining said clutch element in connecting position, and record controlled means for momentarily energizing said electro-magnet at different points in the movement of the driving member to permit the clutch element to be slid out of connecting position.

37. In a machine of the class described, the combination with a rotatable shaft, of a driving member rotatable an invariable distance in one direction and then in the reverse direction to normal position, a clutch normally connecting the shaft and the driving member, record controlled means for operating said clutch at different points in the movement of the driving member the clutch being constructed automatically to connect the shaft and the driving member during movement of the latter in the reverse direction.

38. In a machine of the class described, the combination with a rotatable shaft, of a driving member rotatable an invariable distance in one direction and then in the reverse direction to normal position, a clutch normally connecting the shaft and the driving member, an electro-magnet for controlling the operation of said clutch at different points in the movement of the driving member the clutch being constructed automatically to connect the shaft and the driving member during movement of the latter in the reverse direction, and record controlled means for energizing said electro-magnet.

39. In a machine of the class described, the combination with a rotatable shaft, of a driving member rotatable an invariable distance in one direction and then in the reverse direction to normal position, a clutch normally connecting the shaft and the driving member, record controlled means for operating said clutch at different points in the movement of the driving member in one direction to disconnect the shaft and the driving member the clutch being constructed automatically to connect the shaft and the driving member during movement of the latter in the opposite direction, and means for locking the shaft against rotation while it is disconnected from the driving member.

40. In a machine of the class described, the combination with a rotatable shaft, of a driving member movable an invariable distance in one direction and then in the opposite direction to normal position, a clutch including an element slidably mounted on said shaft and connecting the shaft and the driving member, and means for sliding said clutch element on the shaft at different points in the movement of the driving member in one direction, the clutch being constructed to slide said element during the movement of the driving member in the opposite direction to connect said shaft and driving member.

41. In a machine of the class described, the combination with a rotatable shaft, of a driving member movable an invariable distance in one direction and then in the opposite direction to normal position, a clutch including an element slidably mounted on said shaft and connecting the shaft and the driving member, means for sliding said clutch element on the shaft at different points in the movement of the driving member in one direction, the clutch being constructed to slide said element during the movement of the driving member in the opposite direction to connect said shaft and driving member, and means coöperating with the slidable clutch element for locking the shaft against rotation when the latter is disconnected from the driving member.

42. In a machine of the class described, the combination with a totalizer, of actuators therefor normally out of engagement therewith, a frame for said totalizer, a lever carried on said frame, an electro-magnet the armature of which holds said lever so that the totalizer is normally out of engagement with said actuators, an operating bar, means for operating said electro-magnet whereupon the armature of the latter is moved out of holding position with the lever and engages the latter to move the same into engagement with said bar, and means for operating said bar so that the latter will rock the totalizer into engagement with the actuators.

43. In a machine of the class described, the combination with a plurality of recording devices, of a drum carrying record material, a sliding frame carrying said drum and adapted to be slid in one direction and then in the reverse direction to normal position, a rack and a gear for simultaneously sliding the frame in one direction and rotating the drum, the recording devices being adapted to record on the record material as the drum is rotated over the recording devices, and means for raising the drum upon movement of the frame in the reverse direction.

44. In a machine of the class described, the combination with a plurality of totalizing elements, of transfer mechanism including members operated by the totalizing elements, resetting mechanism for the totalizing elements, said members being operated by the resetting mechanism for locking the totalizing elements in zero position after the elements have been reset to zero position and during part of the operation of the resetting mechanism.

45. In a machine of the class described, the combination with a plurality of totalizing elements, of transfer mechanism including members operated by the totalizing elements, bell crank levers normally alining said totalizing elements, means for operating said levers to reset the totalizing elements to zero and then restoring them to alining position and constructed to operate said members to lock the totalizing elements in zero position while the levers are out of alining position after the totalizing elements have been reset to zero position.

46. In a machine of the class described, the combination with a plurality of totalizers, each comprising a plurality of totalizing elements, of transfer levers common to the totalizing elements, members common to the totalizers and operated by the totalizer elements to control the transfer levers, resetting mechanism for resetting the totalizing elements of all the totalizers to zero and constructed to operate said members to lock the totalizing elements in zero position during part of the operation of the resetting mechanism.

47. In a machine of the class described, the combination with a plurality of totalizing wheels, of a cam member rigid with each wheel, levers one for each totalizer wheel and normally in position to aline the totalizer wheels, and means for rocking said levers so that they move out of alining position and engage the cam members to reset the totalizer wheels to zero.

48. In a machine of the class described, the combination with a plurality of totalizers, of a set of differentially movable actuators common thereto, record means, electromagnetic means for actuating the totalizers, and circuits controlled by the record means for selecting and actuating the electromagnetic means.

49. In a machine of the class described, the combination with a plurality of totalizers, of a set of differentially movable actuators common thereto, record means, electromagnetic means for actuating the totalizers, electromagnetic means for controlling said actuators, and circuits selected by the record means for controlling both the electromagnetic devices which actuate the totalizers and the electromagnetic means which control the actuators.

50. In a machine of the class described, the combination with a plurality of totalizers, of record means having two classes of perforations, actuating mechanism for the totalizers, electrical means controlled by one class of perforations in said record means for selecting the totalizers for operation, and means controlled by the other class of perforations for controlling said actuating mechanism.

51. In a machine of the class described, the combination with a plurality of totalizers, of record means having two classes of perforations, actuating mechanism for the totalizers, electromagnets, one for each totalizer and controlled by the perforations of one class, for selecting the totalizers for operation, and means controlled by the perforations of the other class for controlling the actuating mechanism.

52. In a machine of the class described, the combination with totalizer actuators, of a plurality of totalizers, an electrically operable means for each totalizer normally holding the totalizer disengaged from the actuators, and devices controlled by a perforated record for electrically operating one or more of the aforesaid means whereby to release the desired totalizer or totalizers for engagement with the actuators.

53. In a machine of the class described, the combination with totalizer actuators, of a plurality of totalizers, an electrically operable means for each totalizer normally holding the totalizer disengaged from the actuators, a normally open electrical circuit for each of said means, devices controlled by a perforated record for closing one or more of said circuits whereby to operate one or more of the aforesaid means to release their totalizers for engagement with the actuators, and devices for restoring the operated means to normal condition.

In testimony whereof I affix my signature.

MAXIMILIAN M. GOLDBERG.